(12) United States Patent
He et al.

(10) Patent No.: US 12,501,455 B2
(45) Date of Patent: Dec. 16, 2025

(54) RESOURCE PROCESSING METHOD, APPARATUS, AND MEDIUM

(71) Applicant: Huawei Technologies Co., Ltd., Shenzhen (CN)

(72) Inventors: Hongli He, Beijing (CN); Xueru Li, Beijing (CN); Lan Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 18/043,244

(22) PCT Filed: Jul. 28, 2021

(86) PCT No.: PCT/CN2021/108986
§ 371 (c)(1),
(2) Date: Feb. 27, 2023

(87) PCT Pub. No.: WO2022/042190
PCT Pub. Date: Mar. 3, 2022

(65) Prior Publication Data
US 2023/0319856 A1 Oct. 5, 2023

(30) Foreign Application Priority Data

Aug. 29, 2020 (CN) .......................... 202010890881.4
Nov. 27, 2020 (CN) .......................... 202011358002.X
Jun. 25, 2021 (CN) .......................... 202110709748.9

(51) Int. Cl.
*H04W 72/40* (2023.01)
(52) U.S. Cl.
CPC .................................. *H04W 72/40* (2023.01)

(58) Field of Classification Search
CPC ....... H04W 72/40; H04W 4/40; H04W 4/029; H04W 72/0406; H04W 72/20; H04W 92/18; Y02D 30/70
See application file for complete search history.

(56) References Cited

U.S. PATENT DOCUMENTS

2016/0057736 A1* 2/2016 Jung ..................... H04W 74/06
370/329
2016/0295367 A1* 10/2016 Yu .......................... H04W 72/04
(Continued)

FOREIGN PATENT DOCUMENTS

CN 114125782 A 3/2022
JP 2017506842 A 3/2017
(Continued)

OTHER PUBLICATIONS

3GPP TR 22.832 V17.2.0, Jul. 2020, 3rd Generation Partnership Project; Technical Specification Group Services and System Aspects; Study on enhancements for cyber-physical control applications in vertical domains; Stage 1 (Release 17), 90 pages.

*Primary Examiner* — Rushil P. Sampat
(74) *Attorney, Agent, or Firm* — Conley Rose, P.C.

(57) ABSTRACT

A method includes a first device that sends a beacon message on a beacon indication resource corresponding to a first resource, where the beacon message indicates that the first resource is used by a device in a first user group and another user group cannot use all or a part of the first resource; or the first device skips sending the beacon message on the beacon indication resource corresponding to the first resource such that a device in the other user group determines that the first resource is not used by the device in the first user group and all or part of the first resource can be temporarily used by the device in the other user group.

20 Claims, 17 Drawing Sheets

(56) References Cited

U.S. PATENT DOCUMENTS

| | | | |
|---|---|---|---|
| 2016/0338042 A1 | 11/2016 | Wang et al. | |
| 2019/0335440 A1* | 10/2019 | Tang | H04W 72/20 |
| 2021/0136783 A1* | 5/2021 | Fakoorian | H04W 76/14 |
| 2021/0306983 A1 | 9/2021 | Osawa et al. | |
| 2022/0061040 A1* | 2/2022 | Fong | H04W 72/0446 |
| 2022/0078753 A1* | 3/2022 | Park | H04W 28/02 |
| 2022/0360941 A1* | 11/2022 | Kwak | H04W 72/20 |
| 2023/0036504 A1* | 2/2023 | Sun | H04L 1/1825 |

FOREIGN PATENT DOCUMENTS

| | | |
|---|---|---|
| WO | 2015113645 A1 | 8/2015 |
| WO | 2020054041 A1 | 3/2020 |
| WO | 2020064553 A1 | 4/2020 |
| WO | WO 2021002651 A1 * | 1/2021 |

* cited by examiner

RESOURCE PROCESSING METHOD, APPARATUS, AND MEDIUM

CROSS-REFERENCE TO RELATED APPLICATIONS

This is a U.S. National Stage of International Patent Application No. PCT/CN2021/108986 filed on Jul. 28, 2021, which claims priority to Chinese Patent Application No. 202010890881.4 filed on Aug. 29, 2020, Chinese Patent Application No. 202011358002.X filed on Nov. 27, 2020, and Chinese Patent Application No. 202110709748.9 filed on Jun. 25, 2021, all of which are hereby incorporated by reference in their entireties.

TECHNICAL FIELD

This application relates to the field of communication technologies, and in particular, to a resource processing method, an apparatus, and a medium.

BACKGROUND

A sidelink (sidelink, SL) is an important technology that is in a long term evolution (long term evolution. LTE) system and a fifth generation (the fifth generation, 5G) mobile communications new radio (new radio, NR) system and that enables device-to-device (device to device, D2D) direct communication without a base station. Because transmission between the devices does not need to be forwarded by the base station, the SL can implement a shorter delay, higher spatial multiplexing efficiency, and lower core network load. The SL plays an important role in scenarios with a high local communication requirement, such as vehicle to everything (vehicle to everything, V2X), a smart home, and a smart factory.

Currently, there are mainly two resource allocation modes between SL terminals (user equipments, UEs) in an NR SL: a mode 1 (mode 1) and a mode 2 (mode 2). In the mode 1, a transmission resource is mainly scheduled by a base station for the UE. In the mode 2, a transmission resource is autonomously scheduled by the terminal.

mode 1: For SL UE within coverage of the base station, a transmission resource of the SL UE may be centrally scheduled by the base station. The base station may schedule the transmission resource for the SL UE in a dynamic grant (dynamic grant) or configured grant (configured grant) manner. Configured grant includes a configured grant type 1 (configured grant type 1) or a configured grant type 2 (configured grant type 2).

mode 2: Each SL UE occupies a resource by using a sensing-selection (sensing-selection) mechanism. Each SL UE decodes control information (system control information. SCI) 1 or SCI2 in another received SL message, to learn of resource reservation information; determines an available time-frequency resource location based on the resource reservation information (for example, periodic reservation and one-time reservation) carried in the SCI, an indicated service priority, and reference signal received power (reference signal received power. RSRP) of the SCI; and then randomly selects, from an available resource, a resource for sending data.

For a resource allocation manner in an SL transmission scenario, a group-based resource allocation solution may be introduced. Generally, a group in the SL may also be referred to as a user group (UE group). One UE group may include one or more SL UEs. An SL resource is allocated to the UE group, so that SL UE in the UE group can obtain the SL resource. Under a constraint of ensuring quality of service (quality of service, QoS) of SL communication, how each user group uses an SL resource or how to allocate an SL resource for each group is an urgent problem to be resolved.

SUMMARY

This application provides a resource processing method, an apparatus, and a medium, to reduce a data delay, improve channel resource utilization, and reduce a waste of channel resources.

According to a first aspect, this application provides a resource processing method, including: A first device sends a beacon message on a beacon indication resource corresponding to a first resource, where the beacon message is used to indicate that the first resource is used by a device in a first user group and that another user group cannot use all or a part of the first resource, or the first device skips sending the beacon message on the beacon indication resource corresponding to the first resource, so that a device in the another user group determines that the first resource is not used by the device in the first user group and all or a part of the first resource can be temporarily used by the device in the another user group, where the first device belongs to the first user group, the first resource belongs to a first resource pool, the first resource pool includes a plurality of periodic resources that are allocated to the first user group for sidelink SL communication, and each resource corresponds to one beacon indication resource.

In the foregoing technical solution, resources in the first resource pool are a plurality of periodic resources that are allocated to the first user group for SL communication. A corresponding beacon indication resource may be configured for each periodic resource. The first device can send the beacon message on the beacon indication resource corresponding to the first resource, to indicate the another user group that the first resource is used by the first user group. The another user group can determine, by detecting the beacon message, that the first resource is used by the first user group. The first device skips sending the beacon message on the beacon indication resource corresponding to the first resource, so that the another user group can determine, by not detecting the beacon message, that the first resource is not used by the first user group. The first device indicates usage of the first resource in the beacon message, so as to enable, when the first user group skips using the first resource, the another user group to temporarily occupy the first resource. This can improve periodic resource utilization of the first user group and reduce a waste of channel resources.

In a possible design, the beacon message carries configuration information of the first resource pool, the configuration information is used to indicate resource information of a resource that is in a second resource and that can be used by the another user group when the second resource meets a first condition, and the resource information includes indication information of a target resource unit set and/or indication information of a target user group set; the second resource belongs to the first resource pool, a time domain location of a period corresponding to the second resource is after a time domain location of a period corresponding to the first resource, and the first condition is that the first device skips sending a beacon message on a beacon indication resource corresponding to the second resource; the target resource unit set includes at least one resource unit in the second resource; and the target user group set includes an identifier of at least one user group, and the identifier of the user group is an identifier of a user group capable of using a resource in the target resource unit set.

In the foregoing technical solution, the beacon message can carry the configuration information of the first resource pool, and the configuration information can indicate the resource information of the resource that is in the second resource in the first resource pool and that can be used by the another user group. The second resource is also the resource in the first resource pool, and the time domain location of the period corresponding to the second resource is after the time domain location of the period corresponding to the first resource. The resource information can include a resource in a resource unit set, so that the another user group can learn a status of the resource that can be temporarily used in the second resource. Alternatively, the resource information can include a user group identifier set, so that the another user group can learn a status of the user group that can temporarily use the second resource. That is, in addition to indicating that the current first resource is not released, the beacon message sent by the first device may be used to indicate information such as the resource units in the resource released after the first user group can be occupied and the user group can temporarily perform occupation.

In a possible design, the target resource unit set includes a resource release duration set and/or a resource release frequency domain set; the resource release duration set includes at least one time unit quantity, a first time unit quantity is used to indicate a quantity of time units included in a resource that is in the second resource and that can be used by the device in the another user group, and the first time unit quantity belongs to the at least one time unit quantity; or the resource release duration set includes at least one time unit proportion, and a first time unit proportion indicates a ratio of a time unit included in the resource that is in the second resource and that can be used by the device in the another user group to a total quantity of time units included in the second resource; and the resource release frequency domain set includes indication information corresponding to at least one frequency domain resource in the second resource, and the indication information indicates a frequency domain resource that can be used by the device in the another user group.

In the foregoing technical solution, the target resource unit set can include the resource release duration set, and the resource release duration set includes the quantity of time units that is in the second resource and that can be used by the device in the another user group, or indicates the ratio of the time unit that is in the second resource and that can be used by the device in the another user group to the second resource, so that the another user group can use the second resource. The target resource unit set can include the resource release frequency domain set, and the resource release frequency domain set includes a status of the frequency domain resource that is in the second resource and that can be used by the another user group, so that the another user group uses the frequency domain resource in the second resource. Such a design can improve flexibility and utilization of using, by the another user group, the SL communication resource released by the first user group, and reduce a waste of channel resources.

In a possible design, the beacon message is carried by a Zadeoff-Chu sequence, and a root index of the Zadeoff-Chu sequence is determined based on an identifier of the first user group and a length of the Zadeoff-Chu sequence.

In the foregoing technical solution, different user groups can be distinguished based on a root index of a Zadeoff-Chu sequence. The beacon message can be carried by the Zadeoff-Chu sequence, and the root index of the Zadeoff-Chu sequence carrying the beacon message is determined based on the identifier of the first user group and the sequence length. This can avoid a case in winch the root index of the Zadeoff-Chu sequence used by the first user group is the same as a root index of a Zadeoff-Chu sequence corresponding to the another user group, and avoid confusion caused by beacon messages corresponding to a plurality of user groups.

In a possible design, the Zadeoff-Chu sequence is generated based on the root index and a cyclic shift parameter that is in a cyclic shift parameter set and that corresponds to the configuration information, and the cyclic shift parameter set includes cyclic shift parameters corresponding to a plurality of pieces of configuration information; or the Zadeoff-Chu sequence is a target sequence that is in a sequence set and that corresponds to the configuration information, the sequence set includes sequences corresponding to the plurality of pieces of configuration information, and in the plurality of pieces of configuration information, a sequence corresponding to each piece of configuration information is determined based on the root index and a cyclic shift parameter corresponding to each piece of configuration information.

In the foregoing technical solution, the generated Zadeoff-Chu sequence can carry the configuration information carried in the beacon message. The Zadeoff-Chu sequence carrying the beacon message sent by the first device can be generated based on the sequence root index and the cyclic shift parameter of the configuration information. For example, the first device may determine the cyclic shift parameter based on the configuration information, and perform cyclic shift on a root sequence corresponding to the root index, to generate the Zadeoff-Chu sequence. Alternatively, the Zadeoff-Chu sequence with the beacon message can be the sequence corresponding to the configuration information in the sequence set. Each sequence is determined based on the root index and a cyclic shift parameter corresponding to each piece of configuration information.

In a possible design, the beacon indication resource corresponding to the first resource is orthogonal to a resource in a resource pool corresponding to at least one other user group.

In the foregoing technical solution, the resources in the resource pool of the first user group are periodic. Each resource has a corresponding beacon indication resource. The first device can send a beacon message on a beacon indication resource corresponding to each resource, so as to help the another user group detect the beacon message at a specific location (for example, on the beacon indication resource). This reduces overheads generated during beacon message detection. In addition, a beacon indication resource corresponding to each resource in the first resource pool is orthogonal to a resource in the resource pool corresponding to the another user group, and does not interfere with the resource in the resource pool corresponding to the another user group.

In a possible design, that the first device sends a beacon message on a beacon indication resource corresponding to a first resource further includes: The first device determines that the first user group uses the first resource; and that the first device skips sending the beacon message on the beacon indication resource corresponding to the first resource further includes: The first device determines that the first user group skips using the first resource.

In the foregoing technical solution, when determining that the first user group uses the first resource, the first device can send the beacon message on the beacon indication resource corresponding to the first resource; or when determining that the first user group skips using the first resource, the first device skips sending the beacon message.

In a possible design, that the first device determines that the first user group uses the first resource includes: The first device determines that the first resource is used by a second device, where the second device belongs to the first user group.

In the foregoing technical solution, the first device can determine, by determining whether a device in the first user group uses the first resource, whether the first user group uses the first resource. For example, if the first device determines that the second device in the first user group uses the first resource, the first device can determine that the first user group uses the first resource.

According to a second aspect, this application provides a resource processing method, including: A third device detects a first beacon message on a first beacon indication resource corresponding to a first resource, where the first resource belongs to a first resource pool, the first resource pool includes a plurality of pieces of periodic resources that are allocated to a first user group for sidelink SL communication, each resource corresponds to one beacon indication resource, the third device belongs to a second user group, and the first beacon message is used to indicate that the first resource is used by a device in the first user group and another user group except the first user group cannot use all or a part of the first resource; and if the third device detects the first beacon message, the third device determines that the first resource is used by the device in the first user group and the second user group cannot use the first resource; or if the third device does not detect the first beacon message, the third device determines that the first resource is not used by the device in the first user group and all or a part of the first resource can be temporarily used by the another user group.

In the foregoing technical solution, the third device can detect the first beacon message on the first beacon indication resource corresponding to the first resource. If the third device detects the first beacon message, the third device can determine that the first resource is used by the device in the first user group and the third device cannot use the first resource in the first user group. If the third device does not detect the first beacon message, the third device can determine that the first resource is not used by the device in the first user group, or in other words, the first resource is temporarily released by the first device group, and a device in the another user group can use all or a part of the first resource temporarily released by the first user group.

In a possible design, after if the third device does not detect the first beacon message, the third device determines that the first resource is not used by the device in the first user group and all or a part of the first resource can be temporarily used by the another user group, the method further includes: The third device uses the first resource.

In the foregoing technical solution, if the third device determines, by not detecting the first beacon message, that the device in the first user group skips using the first resource that is allocated to the first user group for SL communication, the third device can transmit data on the first resource. This avoids a waste of the first resource. For example, the third device can transmit data of an aperiodic service temporarily on the first resource that is allocated to the first user group. This improves SL communication service quality.

In a possible design, the first beacon message carries configuration information of the first resource pool, the configuration information is used to indicate resource information of a resource that is in a second resource and that can be used by the another user group when the second resource meets a first condition, and the resource information includes indication information of a target resource unit set and/or indication information of a target user group set; the second resource belongs to the first resource pool, a time domain location of a period corresponding to the second resource is after a time domain location of a period corresponding to the first resource, and the first condition is that the first device skips sending the first beacon message on a beacon indication resource corresponding to the second resource; the target resource unit set includes at least one resource unit in the second resource; and the target user group set includes an identifier of at least one user group, and the identifier of the user group is an identifier of a user group capable of using a resource in the target resource unit set.

In the foregoing technical solution, the first beacon message can carry the configuration information of the first resource pool, and the configuration information can indicate the resource information of the resource that is in the second resource in the first resource pool and that can be used by the another user group. The second resource is also the resource in the first resource pool, and the time domain location of the period corresponding to the second resource is after the time domain location of the period corresponding to the first resource. The resource information can include a resource in a resource unit set, so that the another user group can learn a status of the resource that can be temporarily used in the second resource. Alternatively, the resource information can include a user group identifier set, so that the another user group can learn a status of the user group that can temporarily use the second resource. That is, in addition to indicating that the current first resource is not released, the first beacon message sent by the first user group may be used to indicate the resource units in the resource released after the first user group can be occupied and the user can temporarily perform occupation.

In a possible design, the target resource unit set includes a resource release duration set and/or a resource release frequency domain set; the resource release duration set includes at least one time unit quantity, a first time unit quantity is used to indicate a quantity of time units included in a resource that is in the second resource and that can be used by the device in the another user group, and the first time unit quantity belongs to the at least one tune unit quantity; or the resource release duration set includes at least one time unit proportion, a first time unit proportion indicates a ratio of a time unit that is in the second resource and that can be used by the device in the another user group to a total quantity of time units included in the second resource, and the first time unit proportion belongs to the at least one time unit proportion; and the resource release frequency domain set includes indication information corresponding to at least one frequency domain resource in the second resource, and the indication information indicates a frequency domain resource that can be used by the device in the another user group.

In the foregoing technical solution, the target resource unit set can include the resource release duration set, and the resource release duration set includes the quantity of time units that is in the second resource and that can be used by the device in the another user group, or indicates the ratio of the time unit that is in the second resource and that can be used by the device in the another user group to the second resource, so that the another user group can use the second resource. The target resource unit set can include the resource release frequency domain set, and the resource release frequency domain set includes a status of the frequency domain resource that is in the second resource and that can be used by the another user group, so that the another user group uses the frequency domain resource in the second resource. Such a design can improve flexibility and utilization of using, by the another user group, the SL communication resource released by the first user group, and reduce a waste of channel resources.

In a possible design, the first beacon message is carried by a Zadeoff-Chu sequence, and a root index of the Zadeoff-Chu sequence is determined based on an identifier of the first user group and a length of the Zadeoff-Chu sequence.

In the foregoing technical solution, different user groups can be distinguished based on a root index of a Zadeoff-Chu sequence. The beacon message may be carried by the Zadeoff-Chu sequence, and the root index of the Zadeoff-Chu sequence carrying the beacon message is determined based on the identifier of the first user group and the sequence length. Such a design can help the third device determine or match the user group to which the detected first beacon message belongs. This can also avoid a case in which the root index of the Zadeoff-Chu sequence used by the first user group is the same as a root index of a Zadeoff-Chu sequence corresponding to the another user group, and avoid confusion caused by beacon messages corresponding to a plurality of user groups In a possible design, the Zadeoff-Chu sequence is generated based on the root index and a cyclic shift parameter that is in a cyclic shift parameter set and that corresponds to the configuration information, and the cyclic shift parameter set includes cyclic shift parameters corresponding to a plurality of pieces of configuration information; or the Zadeoff-Chu sequence is a target sequence that is in a sequence set and that corresponds to the configuration information, the sequence set includes sequences corresponding to the plurality of pieces of configuration information, and in the plurality of pieces of configuration information, a sequence corresponding to each piece of configuration information is determined based on the root index and a cyclic shift parameter corresponding to each piece of configuration information.

In the foregoing technical solution, a Zadeoff-Chu sequence carries a beacon message, different configuration information corresponds to different cyclic shift parameters, and Zadeoff-Chu sequences are different; or different configuration information corresponds to different Zadeoff-Chu sequences.

In a possible design, the method further includes: The third device detects a second beacon message on a second beacon indication resource corresponding to a second resource; and if the third device does not detect the second beacon message, and a target user group set included in resource information indicated by the configuration information carried in the first beacon message includes an identifier of the second user group, the third device uses all or a part of the second resource; or if the third device does not detect the second beacon message, the third device uses all or a part of the second resource.

In the foregoing technical solution, after detecting the first beacon message, the third device can continue to detect a beacon message. If the third device determines that a second beacon message is not detected on the second beacon indication resource corresponding to the second resource, the third device can use the second resource. This improves SL communication resource utilization, and avoids a waste of channel resources caused because none of devices in the first user group uses the second resource. Alternatively, the resource release configuration information in the first beacon message detected by the third device may include the user group set. When the identifier of the second user group to which the third device belongs is in the user group set in the first beacon message, the third device can use the second resource. The device in the first user group can indicate, by using the resource information that is indicated by the release configuration information carried in the beacon message and that includes the target user group set, a device in a specific user group to use the second resource temporarily released by the first user group. This improves flexibility of using the SL communication resource.

In a possible design, that the third device uses the second resource includes: The third device transmits data by using all or a part of the second resource; or if the resource information indicated by the configuration information includes the target resource unit set, and the target resource unit set includes a resource release duration set, the third device uses a target time unit in the second resource, where the target time unit is a time unit corresponding to any time unit quantity in the resource release duration set, or the target time unit is a time unit corresponding to any time unit proportion in the resource release duration set; and/or if the resource information indicated by the configuration information includes the target resource unit set, and the target resource unit set includes the resource frequency set, the third device uses a target frequency domain resource in the second resource, where the target frequency domain resource is at least one frequency domain resource corresponding to indication information in the resource release frequency domain set.

In the foregoing technical solution, when the third device uses the second resource, the third device can directly use any resource in the second resource. Alternatively, the third device can use the second resource based on the resource information indicated by the configuration information carried in the first beacon message. For example, the third device can use the time unit or a proportion of any time unit corresponding to any time unit quantity in the resource release duration set included in the resource information indicated by the configuration information carried in the first beacon message. Alternatively, the third device can use the frequency domain resource corresponding to any piece of indication information in the frequency release frequency domain set included in the resource information indicated by the configuration information. The resource information indicated by the configuration information carried in the first beacon message is used, so that the third device uses the second resource. This not only improves flexibility of using the SL communication resource by the third device, improves resource utilization, but also reduces a waste of channel resources.

In a possible design, after the third device detects the first beacon message, the method further includes: The third device stores the first beacon message.

In the foregoing technical solution, after detecting the first beacon message, the third device can store the first beacon message, so that when determining that the first user group temporarily releases the second resource, the third device determines, based on the configuration information carried in the first beacon message, whether the second resource can be used and/or the resource unit in the second resource can be used.

In a possible design, the one beacon indication resource is orthogonal to a resource in a resource pool corresponding to at least one other user group.

In the foregoing technical solution, a beacon indication resource corresponding to a periodic resource in the first resource pool of the first user group is orthogonal to the resource in the resource pool corresponding to another user group. This helps the third device detect, in the resource orthogonal to the SL resource allocated to the second user group to which the third device belongs, a beacon message sent by the another user group, reduces overheads generated during beacon message detection, and does not affect use of the resource in the resource pool of the second user group by the device in the second user group to which the third device belongs.

According to a third aspect, an embodiment of this application provides a resource processing method, including: A first device determines whether a first resource is used by a second device. The first device and the second device belong to a first user group. The first resource is a resource allocated to the first user group for sidelink SL communication. Then, the first device sends a beacon message when the first device determines that the first resource is used by the second device, where the beacon message is used to indicate that the first resource is used.

In the foregoing technical solutions, both the first device and the second device belong to the first user group, and the first resource is an SL communication resource allocated to the first user group. Alternatively, the first device and the second device may be a same device. Alternatively, the first device and the second device may be different devices. The first device determines that the first resource is used by the second device, and then, the first device sends the beacon message after determining that any device in the first user group uses the first resource. The beacon message is used to indicate that the first resource is used. Another user group may determine, by detecting the beacon message, that the first resource is used; or another user group may also determine, by not detecting the beacon message, that the first resource is not used. The another user group uses the first resource that is not used by a device in the first user group. The first device indicates usage of the first resource by using the beacon message. This improves resource utilization and reduces a waste of channel resources.

In a possible design, the beacon message carries resource release configuration information, the resource release configuration information is used to indicate that a second resource can be used by a device in another user group, and the second resource is a resource allocated to the first user group for SL communication, and a time domain location of the second resource is after a time domain location of the first resource.

In the foregoing technical solution, the beacon message can carry the resource release configuration information. The resource release configuration information can indicate that the second resource of the first user group can be used by the device in the another user group. The time domain location of the second resource is after the time domain location of the first resource. The beacon message can not only indicate that the first resource is used by the device in the first user group, but also indicate, by using the resource release configuration information, that the second resource of the first user group can be used by the device in the another user group. This improves SL communication resource utilization and further reduces a waste of channel resources.

In a possible design, the resource release configuration information includes at least one of the following: a resource release duration set, a resource release frequency set, and a user group set, where the resource release duration set includes at least one time unit quantity, a first time unit quantity is used to indicate a quantity of time units included in a resource that is in the second resource and that can be used by the device in the another user group, and the first time unit quantity belongs to the at least one time unit quantity; or the resource release frequency set includes indication information of at least one sub-channel resource in the second resource, and the at least one sub-channel resource can be used by the device in the another user group, and the user group set includes an identifier of at least one user group, and the at least one user group is capable of using the second resource.

In the foregoing technical solution, the first device can indicate, by using the resource release configuration information carried in the beacon message, the quantity of time units that are in the second resource and that can be used by the device in the another user group, or the sub-channel resource that can be used by the device in the another user group, or the user group that can use the second resource. This helps the another user group use the second resource, improves flexibility of using the SL communication resource, not only further improves resource utilization, but also further reduces a waste of channel resources.

In a possible design, the sending a beacon message includes: The first device sends the beacon message in a first time unit in the first resource; or the first device sends the beacon message on a target resource, where the target resource is a resource whose time domain location is before a time domain location of the first resource and that is orthogonal to a resource of any user group.

In the foregoing technical solution, the first device sends the beacon message in the first time unit in the first resource or sends the beacon message on the target resource. This helps the another user group detect the beacon message in the first time unit or on the target resource, and reduces overheads of detecting the beacon message by the another user group.

In a possible design, the target resource is a physical sidelink shared channel.

In the foregoing technical solution, the first device can send the beacon message on the physical sidelink shared channel. This helps the another user group detect the beacon message on the physical sidelink shared channel, and reduces overheads generated during beacon message detection.

According to a fourth aspect, an embodiment of this application provides a resource processing method, including: A third device detects a first beacon message, where the first beacon message is used to indicate that a first resource is used, and the first resource is a resource allocated to a first user group for sidelink SL communication. If the third device detects the first beacon message, the third device detects that the first resource is used. If the third device does not detect the first beacon message, the third device detects that the first resource is not used.

In the foregoing technical solutions, the third device can detect the first beacon message used to indicate that the first resource is used, and the first resource is an SL communication resource of the first user group. If the third device detects the first beacon message, the third device can determine that the first resource is used by a device in the first user group and the third device cannot use the first resource of the first user group. If the third device does not detect the first beacon message, the third device can determine that the first resource is not used by the device in the first user group, and the third device can use the first resource of the first user group. Therefore, the third device can determine usage of the first resource based on the beacon message, to determine whether the first resource can be used by the third device. This helps use the first resource when it is determined that the first resource is not used, improves resource utilization, and reduces a waste of channel resources.

In a possible design, after the third device determines, if the third device does not detect the first beacon message, that none of devices in the first user group uses the first resource, the method further includes: The third device uses the first resource.

In the foregoing technical solution, after determining that none of the devices in the first user group uses the first resource, the third device can transmit data on the first resource. This avoids a waste of the first resource because none of the devices in the first user group uses the first resource. In addition, in an SL communication scenario, the third device can transmit data of an aperiodic service on the first resource of the first user group. This can improve quality of service of SL communication.

In a possible design, the first beacon message carries resource release configuration information, the resource release configuration information is used to indicate another user group to use a second resource, the second resource is a resource that is allocated to the first user group for SL communication, and a time domain location of the second resource is after a time domain location of the first resource.

In the foregoing technical solution, the first beacon message can carry the resource release configuration information. The resource release configuration information can indicate that the second resource of the first user group can be used by the device in the another user group. The time domain location of the second resource is after the time domain location of the first resource. The first beacon message can not only indicate that the first resource is used by the device in the first user group, but also indicate, by using the resource release configuration information, that the second resource of the first user group can be used by the device in the another user group. This improves SL communication resource utilization and further reduces a waste of channel resources.

In a possible design, the resource release configuration information includes at least one of the following: a resource release duration set, a resource release frequency set, and a user group set, where the resource release duration set includes at least one time unit quantity, a first time unit quantity is used to indicate a quantity of time units included in a resource that is in the second resource and that can be used by the device in the another user group, and the first time unit quantity belongs to the at least one time unit quantity; or the resource release frequency set includes indication information of at least one sub-channel resource in the second resource, and the at least one sub-channel resource can be used by the device in the another user group; and the user group set includes an identifier of at least one user group, and the at least one user group is capable of using the second resource.

In the foregoing technical solution, the resource release configuration information carried in the first beacon message indicates the quantity of time units that are in the second resource and that can be used by the device in the another user group, or can indicate indication information of the sub-channel resource, or the user group that can use the second resource. The third device can use the second resource based on the resource release configuration information. This improves flexibility of using the SL communication resource, improves resource utilization, and reduces a waste of channel resources.

In a possible design, the third device detects a second beacon message, where the second beacon message is used to indicate that the second resource is used. If the third device does not detect the second beacon message, a user group set included in the resource release configuration information in the first beacon message includes an identifier of a second user group, and the third device belongs to the second user group, the third device uses the second resource. Alternatively, if the third device does not detect the second beacon message, the third device uses the second resource.

In the foregoing technical solution, after detecting the first beacon message, the third device can continue to detect a beacon message. If the third device determines that the second beacon message used to indicate that the second resource is used is not detected, the third device can use the second resource. This improves SL communication resource utilization, and avoids a waste of channel resources caused because none of devices in the first user group uses the second resource. Alternatively, the resource release configuration information in the first beacon message detected by the third device may include the user group set, and the identifier of the second user group to which the third device belongs is in the user group set in the first beacon message. The device in the first user group includes the user group set in the resource release configuration information carried in the beacon message, to indicate the device in the user group corresponding to the identifier in the user group set to use the second resource. This improves flexibility of using the SL communication resource. A user group corresponding to the identifier in the user group set can transmit aperiodic data on the second resource that is not used by the device in the first user group. This improves SL communication resource utilization.

In a possible design, after the third device detects the first beacon message, the method further includes: The third device stores the first beacon message.

In the foregoing technical solution, after detecting the first beacon message, the third device can store the first beacon message, so that when determining that the first user group skips using the second resource, the third device uses the second resource based on the resource release configuration information carried in the first beacon message.

In a possible design, that the third device uses the second resource includes: The third device transmits data by using any resource of the second resource: or if the resource release configuration information carried in the first beacon message includes the resource release duration set, the third device uses a target time unit in the second resource, where the target time unit is a time unit corresponding to any time unit quantity in the resource release duration set: or if the resource release configuration information carried in the first beacon message includes the resource frequency set, the third device uses a target sub-channel in the second resource, where the target sub-channel is any one of at least one sub-channel resource corresponding to indication information in the resource release frequency set.

In the foregoing technical solution, when the third device uses the second resource, the third device can directly use any resource in the second resource. Alternatively, the third device uses the second resource based on the resource release configuration information carried in the first beacon message. For example, the third device uses the time unit corresponding to any time unit quantity in the resource release duration set in the resource release configuration information carried in the first beacon message. Alternatively, the third device may use any sub-channel in the resource frequency set in the resource release configuration information. The resource release configuration information carried in the first beacon message is used to indicate the third device to use the second resource. This not only improves flexibility of using the SL communication resource by the third device, improves resource utilization, but also reduces a waste of channel resources.

In a possible design, that the third device uses the second resource further includes: The third device notifies a fourth device in the second user group to use the second resource, where the fourth device is any device m the second user group other than the third device.

In the foregoing technical solution, when using the second resource, the third device can further indicate another device in the second user group to use the second resource, and the another device in the second user group does not need to detect a beacon message. This further reduces overheads of detecting the beacon message by the device in the second user group.

In a possible design, that a third device detects a first beacon message includes: The third device detects the first beacon message in a first time unit in the first resource; or the third device detects the first beacon message on a target resource, where the target resource is a resource whose time domain location is before a time domain location of the first resource and that is orthogonal to a resource of any user group.

In the foregoing technical solution, the third device can detect the first beacon in the first time unit in the first resource or on the target resource. This can reduce overheads caused by beacon message detection.

In a possible design, the target resource is a physical sidelink shared channel.

In the foregoing technical solution, the third device can detect the beacon message on the physical sidelink shared channel. This reduces overheads generated during beacon message detection.

In a possible device design, the target resource is any resource element on the physical sidelink shared channel.

According to a fifth aspect, an embodiment of this application provides a communication apparatus. The communication apparatus may be a first device or a chip or a system-on-a-chip in the first device. The communication apparatus includes a processor and a transceiver. The transceiver may receive or send a beacon message under control of the processor. The processor may perform the method in any design of the first aspect, the second aspect, the third aspect, or the fourth aspect.

According to a sixth aspect, an embodiment of this application provides a communication apparatus. The communication apparatus may be a third device or a chip or a system-on-a-chip in the third device. The communication apparatus includes a processor and a transceiver. The transceiver may receive or send a beacon message under control of the processor. The processor may perform the method in any design of the first aspect, the second aspect, the third aspect, or the fourth aspect.

According to a seventh aspect, an embodiment of this application provides a computer-readable storage medium. The computer-readable storage medium stores program instructions, and when the program instructions are run on a computer, the computer is enabled to perform the method in any design of the first aspect, the second aspect, the third aspect, or the fourth aspect. For example, the computer-readable storage medium may be any usable medium accessible to the computer. By way of example and not limitation. The computer-readable medium may include a non-transient computer-readable medium, a random-access memory (random-access memory. RAM), a read-only memory (read-only memory, ROM), an electrically erasable programmable read-only memory (electrically EPROM. EEPROM), a CD-ROM or another optical disc storage, a magnetic disk storage medium or another magnetic storage device, or any other medium that can be used to carry or store expected program code in a form of an instruction or a data structure and can be accessed by the computer.

According to an eighth aspect, a computer program product including instructions is provided. When the computer program product runs on a computer, the computer is enabled to the method in any design of the first aspect, the second aspect, the third aspect, or the fourth aspect.

According to a ninth aspect, a chip is provided. The chip includes a processor, and when the processor executes instructions, the processor is configured to perform the method in any design of the first aspect, the second aspect, the third aspect, or the fourth aspect. The instructions may be from a memory inside the chip, or may be from a memory outside the chip. Optionally the chip further includes an input/output circuit.

According to a tenth aspect, a communication system is provided. The communication system includes a first device and a third device. The first device is configured to perform the resource processing method in any design of the first aspect, and the third device is configured to perform the resource processing method in any design of the second aspect; or the first device is configured to perform the resource processing method in any design of the second aspect, and the third device is configured to perform the resource processing method in any design of the second aspect.

For technical effects brought by any design in the fifth aspect to the tenth aspect, refer to technical effects brought by the foregoing corresponding methods. Details are not described herein again.

DESCRIPTION OF EMBODIMENTS

Figure 1:
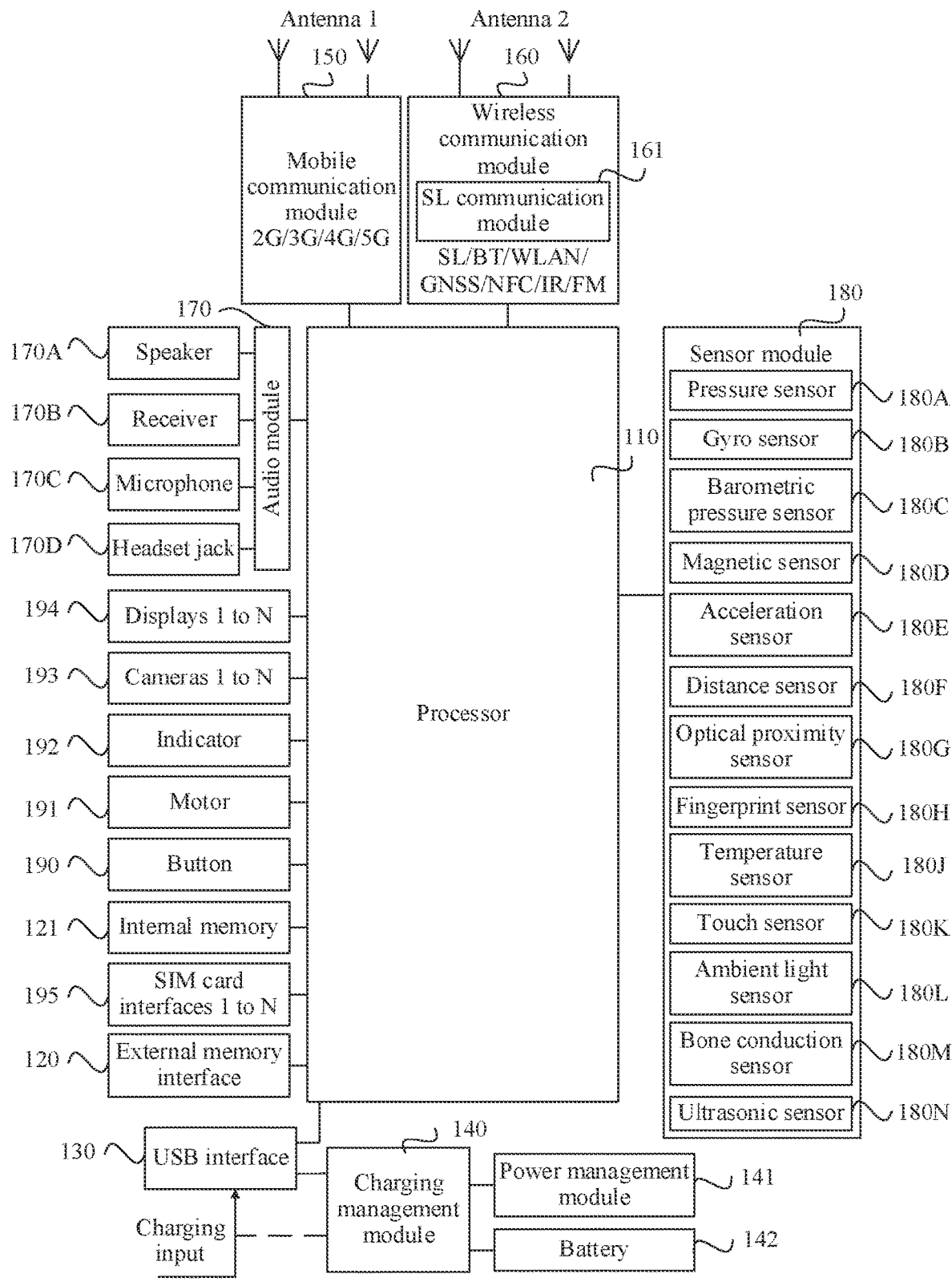
FIG. 1 is a schematic diagram of a structure of a terminal according to an embodiment of this application.

In descriptions of this application, unless otherwise specified. "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition. "at least one" means one or more, and "a plurality of" means two or more. Terms such as "first" and "second" do not limit a quantity and an execution sequence, and the terms such as "first" and "second" do not indicate a definite difference.

It should be noted that, in this application, words "for example" or "such as" are used to represent giving an example, an illustration, or a description. Any embodiment or design scheme described as an "example" or "for example" in this application should not be construed as being more preferred or having more advantages than another embodiment or design scheme. Exactly, use of the words such as "example" or "for example" is intended to present a related concept in a specific manner.

Currently, there are mainly two resource allocation modes between SL UEs in an NR SL: a mode 1 (mode 1) and a mode 2 (mode 2). In the mode 1, a transmission resource is mainly scheduled by a base station for the UE. In the mode 2, a transmission resource is autonomously scheduled by the terminal.

mode 1: For SL UE within coverage of the base station, a transmission resource of the SL UE may be centrally scheduled by the base station. The base station may schedule the transmission resource for the SL UE in a dynamic grant (dynamic grant) or configured grant (configured grant) manner. Configured grant includes a configured grant type 1 (configured grant type 1) or a configured grant type 2 (configured grant type 2).

mode 2: Each SL UE occupies a resource by using a sensing-selection (sensing-selection) mechanism. Each SL UE decodes SCI 1 or SCI 2 in another received SL message, to learn resource reservation information; and determines an available time-frequency resource location based on the resource reservation information (for example, periodic reservation and one-time reservation) carried in the SCI, an indicated service priority, and RSRP of the SCI, and then randomly selects, from an available resource, a resource for sending data.

For a resource allocation manner in an SL transmission scenario, a group-based resource allocation solution may be introduced. Generally, a group in the SL may also be referred to as a user group. One UE group may include one or more SL UEs. An SL resource is allocated to the UE group, so that SL UE in the UE group can obtain the SL resource; or the one or more SL UEs in the UE group replace the entire UE group to occupy the SL resource, so that another SL UE in the UE group can obtain the SL resource. Under a constraint of ensuring QoS, how each group to occupy an SL resource or how to allocate an SL resource to each group is an urgent problem to be resolved.

A solution is to use a resource contention mechanism in NR-U or 6th generation wireless fidelity (wireless fidelity, Wi-Fi), for example, a listen before talk (listen before talk, LBT) mechanism in NR-U and a carrier sense multiple access (carrier sense multiple access, CSMA) mechanism in 6th generation Wi-Fi. A base station in NR-U and UE within coverage of the base station may be considered as one UE group, and each group occupies a resource by using the LBT mechanism. In 6th generation Wi-Fi, a basic service set (basic service set, BSS) may be considered as a UE group. The BSS usually includes an access point (Access point, AP) and each station (Station, STA), and each BSS occupies a resource by using a channel selection and a CSMA mechanism.

However, channel resources occupied by each UE group in NR-U and 6th generation Wi-Fi are obtained through non-orthogonal division, that is, a plurality of UE groups have an opportunity to occupy a same channel resource. Therefore, each UE group needs to contend for the channel resource use opportunity by using the LBT mechanism or the CSMA mechanism, to occupy the resource to transmit data. If there are a small quantity of UE groups that have the opportunity to occupy the same channel resource, each UE group can successfully occupy the channel resource by using the LBT mechanism and the CSMA mechanism to transmit the data. However, if there are a large quantity of UE groups that have the opportunity to occupy the same channel resource, severe contention for the channel resource easily occurs, resulting in a reduced opportunity for each UE group to successfully occupy the resource.

In some typical SL transmission scenarios, a data service transmitted on an SL channel resource has an obvious periodic characteristic, and has a high requirement on a delay. If the LBT mechanism and the CSMA mechanism are applied to the scenario in which the SL channel resource is used for transmission, it is difficult to ensure periodic data transmission and delay QoS.

Based on this, embodiments of this application provide a resource processing method and an apparatus, to improve channel resource utilization and avoid a waste of channel resources. The method and the apparatus are based on a same inventive concept. Because the method and the apparatus have a similar problem-resolving principle, for implementations of the apparatus and the method, refer to each other, and no repeated description is provided.

A terminal in embodiments of this application may be a sidelink terminal (sidelink user equipment, SL UE), or may be UE having an SL communication capability. The SL UE may perform one-to-one communication, one-to-many communication, or many-to-one communication. This is not limited in embodiments of the present invention. For example, the SL UE may be a terminal such as a mobile phone, a tablet computer, a notebook computer, a virtual reality device, an augmented reality device, a hybrid reality device, an intelligent wearable device, a router, or a server. Alternatively, the SL UE may be a terminal having an SL communication capability and a processor, for example, a vehicle, a smart home device (such as a television, a smart stereo, a smart refrigerator, a smart microwave oven, or a smart lighting device), a robot, a central control device, a sensor device, or a measurement device.

FIG. 1 is a schematic diagram of a structure of a terminal. The terminal may include a processor 110, an external memory interface 120, an internal memory 121, a universal serial bus (universal serial bus. USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module. SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit. GPU), an image signal processor (image signal processor, ISP), a controller, a memory, a video codec, a digital signal processor (digital signal processor, DSP), a baseband processor, and/or a neural-network processing unit (neural-network processing unit, NPU).

The wireless communication module 160 may be one or more components integrating at least one communication processor module. The wireless communication module 160 may include an SL communication module 161, and may provide an SL communication solution applied to the terminal 100. The wireless communication module 160 may also provide a solution including wireless communication such as a wireless local area network (wireless local area network. WLAN) (for example, a Wi-Fi network), Bluetooth (Bluetooth. BT), a global navigational satellite system (global navigation satellite system, GNSS), frequency modulation (frequency modulation, FM), near field communication (near field communication, NFC), and an infrared (infrared, IR) technology.

In an example, an application layer of the terminal may include a series of application packages. The application package may be a preset application package, for example, Gallery, Calendar. Phone, Map, Navigation. Music, Videos, or Messages, or may be a third-party application package, for example. WeChat or Weibo. Alternatively, the application package may be a program package (or may use another name) of an SL communication application, and may be added to the application layer in a preset manner, or may be added to the application layer in a download or import manner. The SL communication application may provide a function of enabling SL communication by the terminal, and may also provide a function of grouping SL UEs. After a user touches and starts the SL communication application, the touch sensor 180K sends a collected signal to the processor 110, and the processor 110 may invoke the SL communication application at the application layer.

The resource processing method provided in embodiments of this application may be applied to a user group. SL UEs in a UE group may be classified into a group head (group head. GH) and a group member (group member, GM). The GH allocates and schedules a resource occupied by the UE group. The GH may further send a scheduling instruction, a broadcast message, power information, and intra-group information in the UE group.

GHs in different user groups may contend for a resource, to reduce resource contention overheads and interference of GHs and GMs in a plurality of user groups between groups. In different application scenarios, the GH may have different resource allocation and scheduling capabilities. For example, in a platooning (platooning) traveling scenario, the GH may have a strong resource allocation and scheduling capability. After obtaining the resource through contention, the GH may allocate the resource to the GM in the user group in an allocation manner. This can reduce contention overheads of the GM in the group. In a multi-vehicle free queue scenario, the GH may have a weak resource allocation and scheduling capability. After obtaining the resource through contention, the GH and each GM in the user group may occupy, in a contention manner, the resource previously obtained by the GH through contention. Alternatively, the GH may be any SL UE in the UE group. Generally, SL UEs in the platooning traveling scenario may travel in a platoon, and the SL UEs are vehicles produced by a same vendor. SL UEs in a multi-vehicle platoon scenario may perform spontaneous platooning or temporary platooning, and the SL UEs may be produced by different vendors.

In embodiments of this application, different grouping methods may be used in different scenarios, for example, SL scenarios such as V2X, smart home, and smart factory.

A V2X scenario is used as an example, and each vehicle platoon may be used as one UE group. Vehicles in each UE group may communicate with each other through an SL, which may be referred to as intra-group SL communication. Vehicles in different UE groups may also communicate with each other through an SL, which may be referred to as inter-group SL communication.

Figure 2:
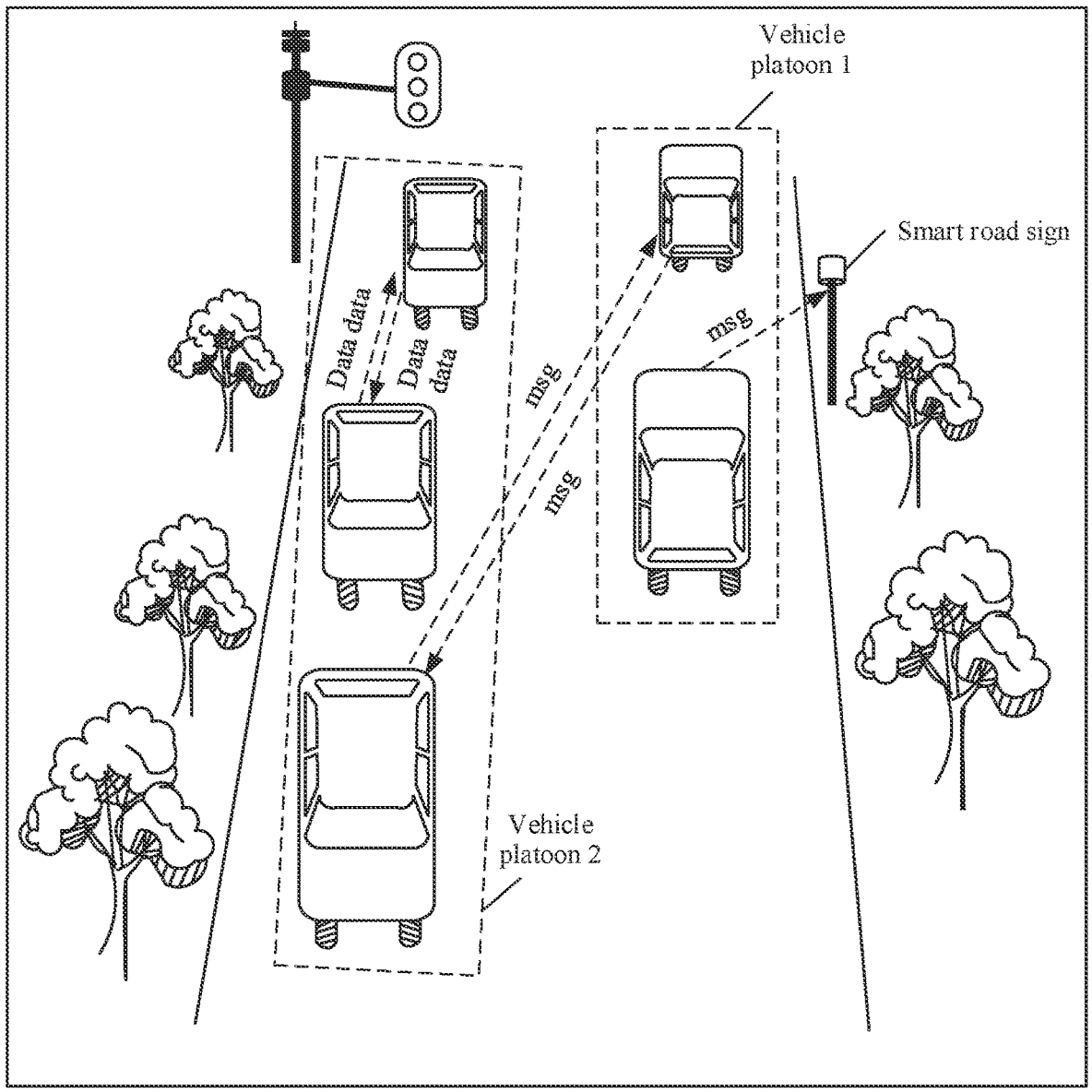
FIG. 2 is a schematic diagram of an application scenario according to an embodiment of this application.

FIG. 2 shows two vehicle platoons, namely, two UE groups. One UE group includes three vehicles. The other UE group includes two vehicles. In a same UE group, two vehicles may transmit a control instruction, a message (msg), or data (data) through an SL. A control instruction, a message, or data may also be transmitted between different UE groups through an SL. In V2X, if a UE group is within coverage of a base station, a vehicle in the UE group may also establish a communication connection to the base station.

In the V2X application scenario, a vehicle in each UE group may also communicate with an ITS roadside radio equipment such as an intelligent road sign or a traffic light in an intelligent transportation system (intelligent traffic system, ITS), to report data or information of the vehicle to the ITS: or the vehicle may send a message or a data request to the ITS, and the ITS delivers traffic data to the vehicle, for example, traffic data such as a traffic jam, an accident warning, road construction, a traffic signal, or a sign indication.

Each UE group in V2X may perform SL communication by using an unlicensed spectrum resource. For example, a frequency band of 5905 MHz to 5924 MHz is planned as a working frequency band for V2X direct-link communication according to Administrative Regulations on Use of Frequency Band of 5905 MHz to 5924 MHz in Direct-Link Communication of Internet of Vehicles (Intelligent Connected Vehicles) (Trial). Each UE group in V2X can perform SL communication on the frequency band of 5905 MHz to 5924 MHz.

Each UE group in V2X may perform SL communication by using a licensed spectrum resource. For example, an operator may also allocate a licensed spectrum to V2X, and each UE group in V2X may also perform SL communication by using the licensed spectrum resource allocated by the operator.

A smart home scenario is used as an example, SL UE devices may be grouped based on functions. SL UE devices in a UE group have a same function. For example, UEs having a video playing function may be grouped into one group, and UEs having an audio playing function may be grouped into one group.

Figure 3:
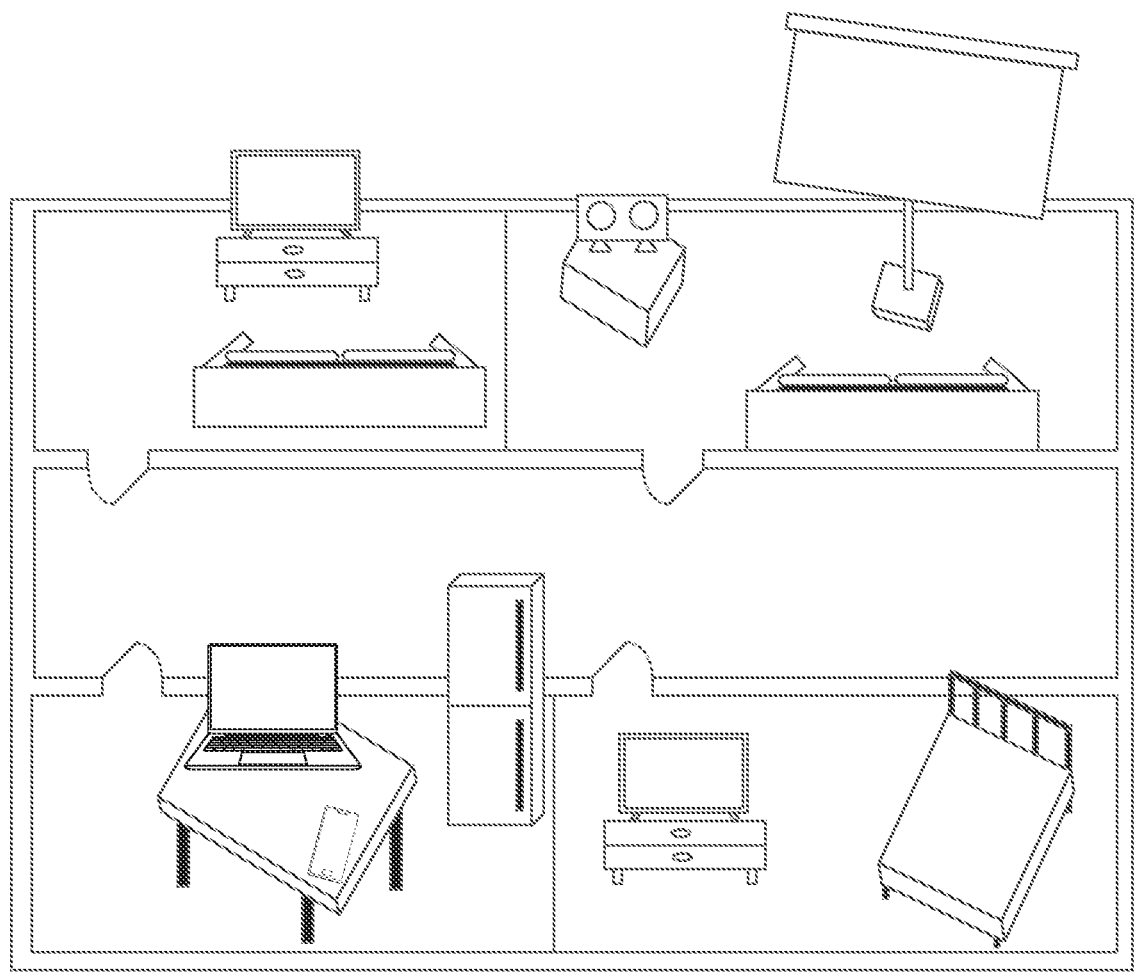
FIG. 3 is a schematic diagram of an application scenario according to an embodiment of this application.

FIG. 3 shows a smart home scenario. SL UE may be a television, a computer, a mobile phone, a projection device, or a stereo. A UE group 1 includes UEs having a video playing function, such as a television, a projection device, a computer, and a mobile phone. A UE group 2 includes UEs having an audio playing function, for example, a stereo, a mobile phone, or a smart home device (for example, a smart refrigerator) having an audio playing function. If multifunctional UE is included in the smart home scenario, the UE may be included in different groups at the same time.

A smart factory scenario is used as an example. A smart factory usually includes a plurality of production lines, mechanical arms, and mechanical arm control devices. The mechanical arm in the smart factory may be SL UE. SL UEs controlled by a same production line controller may form a UE group; or SL UEs controlled by a same machine controller may form a UE group.

Figure 4:
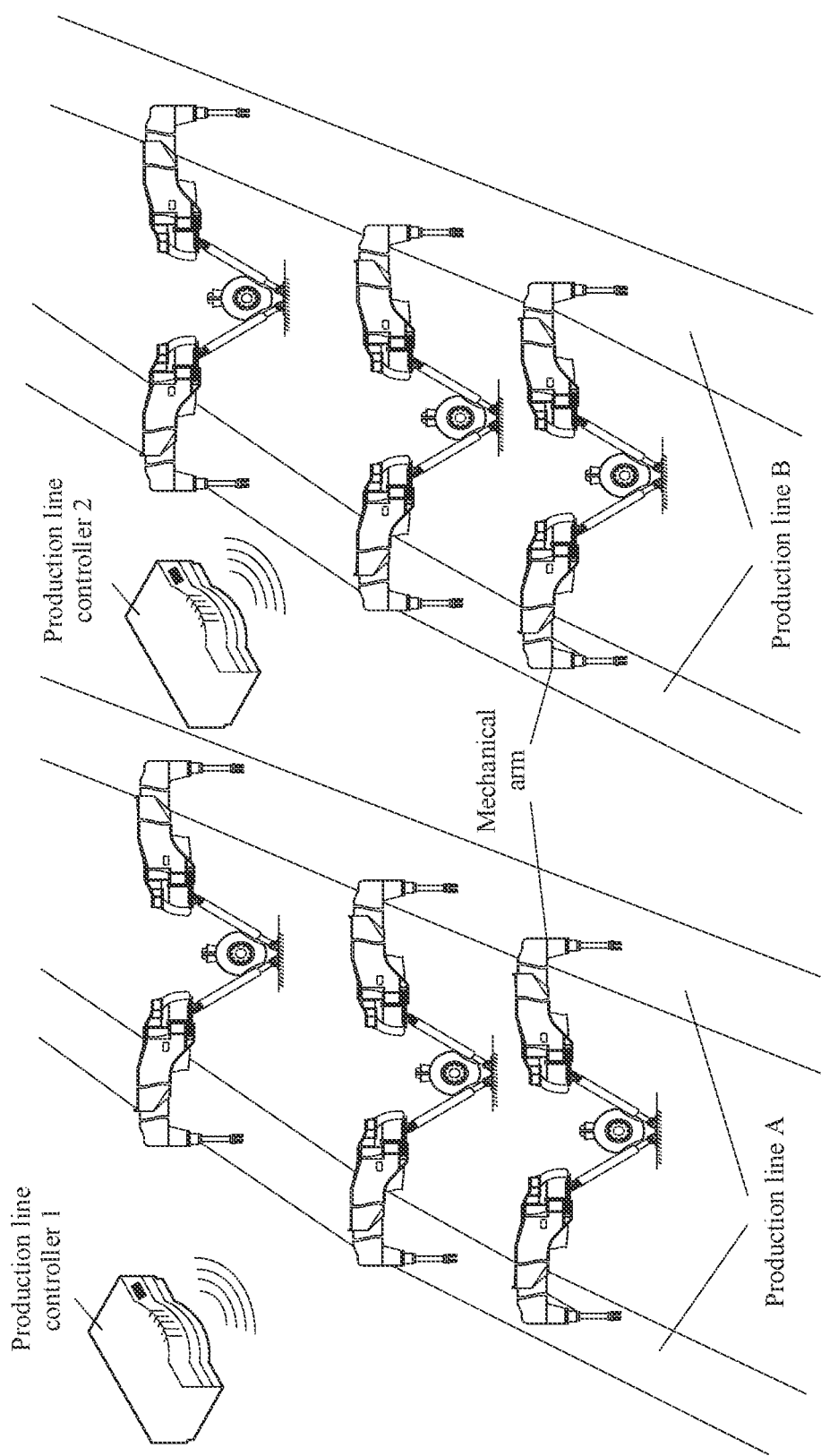
FIG. 4 is a schematic diagram of an application scenario according to an embodiment of this application.

FIG. 4 shows a smart factory scenario. The smart factory includes two production lines: a production line A and a production line B. A production line controller 1 may control a plurality of mechanical arms (which may also be referred to as robotic hands, robotic arms, or robots) on the production line A. and a production line controller 2 controls a plurality of mechanical arms on the production line B. A mechanical arm may perform operations such as adding, disassembling, and moving elements and components on a production line, and may also perform operations such as perfusion, coating, and filling on food and articles on the production line. Mechanical anus on a same production line can perform the same or different operations. For example, an upstream mechanical arm on a production line performs an element measurement operation, and notifies a downstream mechanical arm of element measurement data, and the downstream mechanical arm performs a classification operation on an element.

In a possible implementation, a user manually groups SL UEs. The user may perform grouping by using an SL UE control terminal. The control terminal has a terminal with the hardware structure shown in FIG. 1. For example, the processor 110 may control the wireless communication module 160 to search for SL UE in a current environment. For example, the SL UE is searched for by using SL networking signaling. The wireless communication module 160 receives a to-be-sent signal from the processor 110, converts the signal into an electromagnetic wave through the antenna 2, and radiates the electromagnetic wave. The wireless communication module 160 receives an electromagnetic wave through the antenna 2, performs frequency modulation and filtering processing on the electromagnetic wave signal, and sends a processed signal to the processor 110.

The processor 110 modulates and demodulates a signal sent by the wireless communication module 160, to determine an identifier of the SL UE in the current environment. The processor 110 invokes, by using the GPU, a control for displaying a file, a control for displaying an image, and the like, to generate a display interface including the identifier of the SL UE for selection, and displays the display interface on the display 194.

Figure 5:
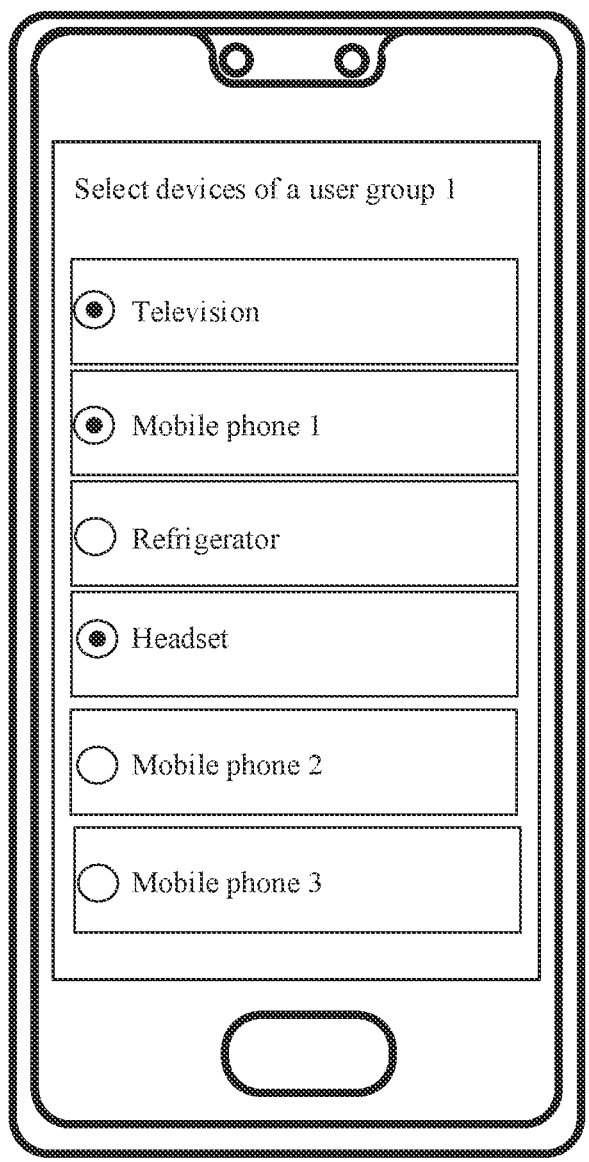
FIG. 5 is a schematic diagram of a user interface according to an embodiment of this application.

As shown in FIG. 5, the display interface provided by the terminal for the user to set up the UE group includes identifiers (or names) of all found SL UEs, for example, a television, a refrigerator, a headset, a mobile phone 1, a mobile phone 2, and a mobile phone 3. The user can select devices in the display interface to set up a user group 1. The touch sensor 180K sends a collected signal to the processor 110, and the processor 110 determines, based on the collected signal sent by the touch sensor 180K, that the SL UEs selected by the user are the television, the mobile phone 1, and the headset.

Figure 6:
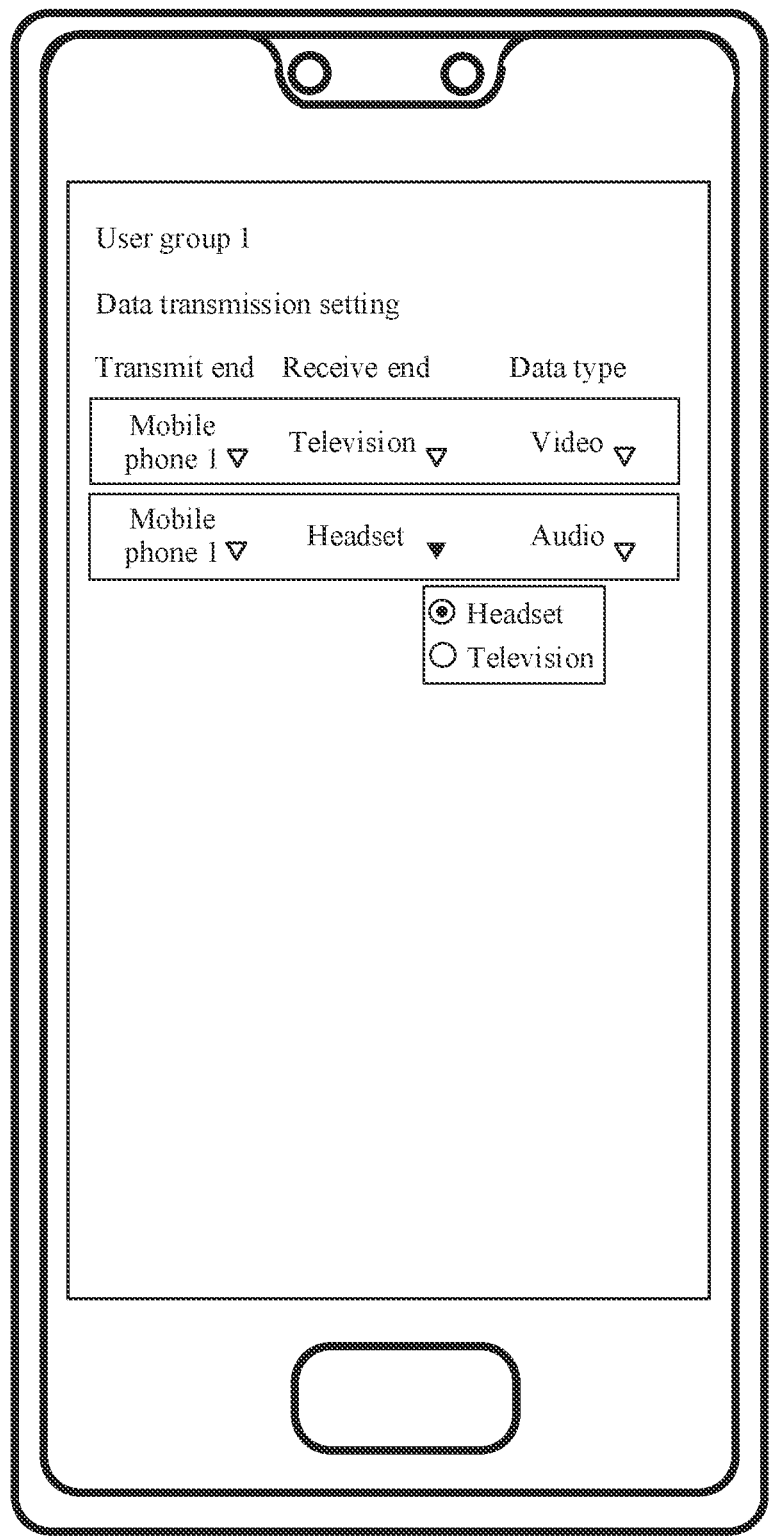
FIG. 6 is a schematic diagram of a user interface according to an embodiment of this application.

For example, the terminal may further provide a display interface with a data transmit end SL UE and a data receive end SL UE in the UE group. As shown in FIG. 6, the display interface may include a plurality of display items such as the transmit end, the receive end, and a data type. The transmit end, the receive end, and the data type may be default configurations. The default configuration may be determined based on information such as function information and a terminal type of each UE in the UE group set up by the user.

The display interface may further include a modify button (for example, a triangle in the figure). After the modify button is triggered, all options in a display item are displayed for the user to modify. As shown in FIG. 6, the user may tap a modify button next to "Headset" below a display item of the receive end, to trigger display of all options "Headset", "Television", and a selection button, so that the user can modify the receive end device.

In another possible implementation, a UE group may be automatically set up by SL UEs, that is, the user may not need to participate in a UE group set-up process. For example, SL UEs produced by a same vendor or different vendors may be automatically connected together after the devices are powered on, to form a UE group. For example, after the SL UEs are powered on, the UE group is set up according to a preset protocol or a proprietary protocol. For example, after being powered on, an augmented reality display device and a control device may automatically form a UE group. For another example, after being powered on, a smartphone and a smart headset automatically form a UE group.

In embodiments of this application, an SL resource used by each UE group to transmit data may be a licensed spectrum resource, or may be an unlicensed spectrum resource. If the SL resource is the licensed spectrum resource, an operator may manage and allocate the resource. A source or ownership of the resource is not specifically limited in embodiments of this application.

In an SL communication scenario, a transmission requirement of SL UE in each UE group is mostly periodic data transmission. When there are a large quantity of UE groups, severe contention for a channel resource easily occurs by using an LBT mechanism, a CSMA mechanism, or a perception selection mechanism. As a result, opportunities for successfully occupying the resource by the UE groups are reduced, the SL UE is affected to periodically transmit data, and a long delay occurs in data transmission.

To ensure that the SL UE in each UE group can periodically transmit data, GHs in the UE groups may determine, in an interactive negotiation manner, a resource used by each UE group, or determine, in an allocation manner of a base station, the resource used by each UE group. For example, the base station sends a resource configuration instruction to a GH in each UE group, and the resource configuration instruction may include resource time-frequency information and a period. The base station sends the resource configuration instruction to the GH, and implements semi-persistent scheduling of a time-frequency resource of the UE group. The UE group may periodically use the resource corresponding to the time-frequency information in the resource configuration instruction. In addition, there are aperiodic services for the UE groups. Therefore, periodic resources allocated to the UE groups are redundant. The UE group may occupy, in the semi-persistent scheduling period, the time-frequency resource corresponding to the resource configuration instruction. This ensures the requirement of periodically transmitting the data by the SL UE in each UE group. However, when a data amount of an aperiodic service is excessively small and redundant resources are excessively large in the resources of the UE groups, or the requirement of the SL UE for periodically transmitting the data is reduced, or a large quantity of resources are allocated to a UE group that does not have a large data transmission requirement, this semi-persistent scheduling manner causes a waste of resources.

The resource processing method provided in embodiments of this application reduces a data delay, and can further improve channel resource utilization and reduce a waste of channel resources. The resource processing method provided in embodiments of this application is not only applicable to a periodic data transmission scenario, but also applicable to a scenario in which a data amount of an aperiodic service dynamically changes. The following describes the resource processing method provided in this application with reference to specific examples.

The resource processing method provided in embodiments of this application may be applied to a scenario of a plurality of UE groups. Periodic resources allocated to the UE groups are orthogonal, and no resource overlapping (for example, time domain resource overlapping or frequency domain resource overlapping) occurs. Each UE group transmits data by using an allocated resource.

Figure 7:
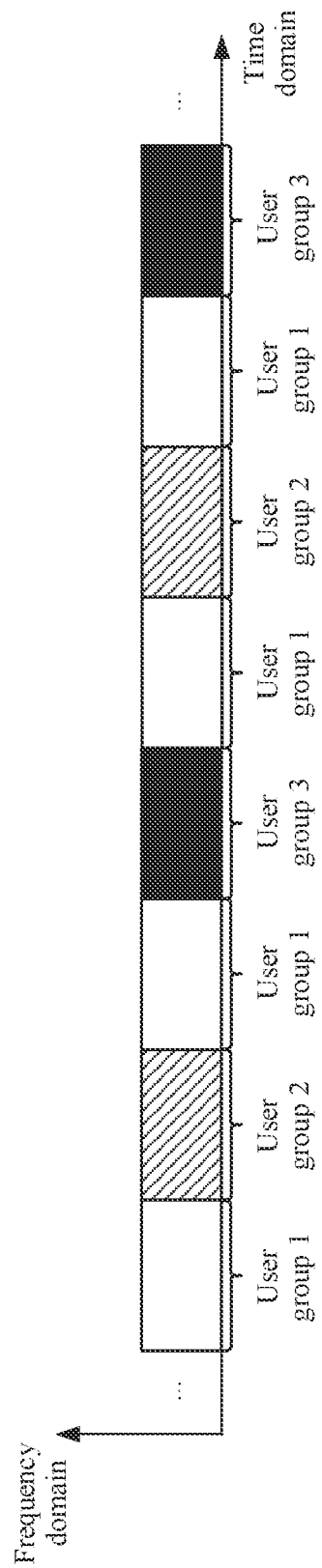
FIG. 7 is a schematic diagram of a resource of a user group according to an embodiment of this application.

FIG. 7 shows an example of resources occupied by three UE groups, which are also SL resources allocated to the three UE groups. Time domain resources occupied by a UE group 1 and a UE group 2 are orthogonal, time domain resources occupied by the UE group 2 and a UE group 3 are also orthogonal, and time domain resources occupied by the UE group 1 and the UE group 3 are also orthogonal.

Figure 8:
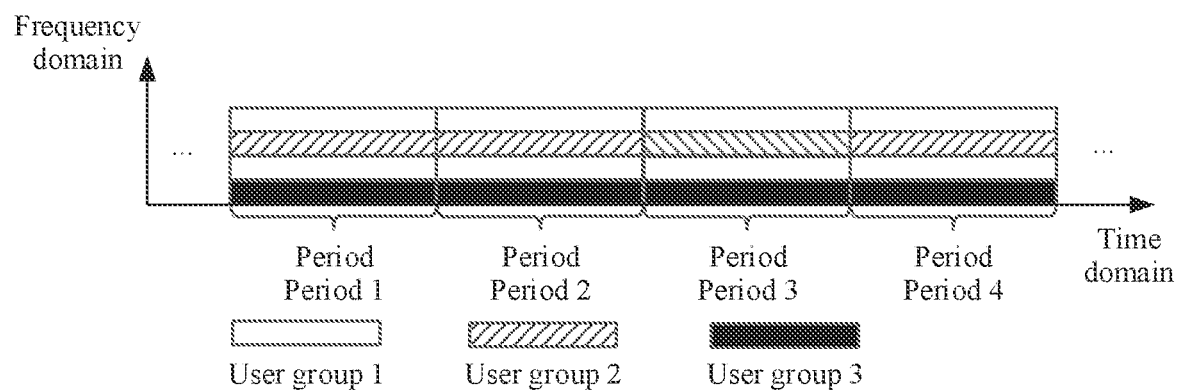
FIG. 8 is a schematic diagram of a resource of a user group according to an embodiment of this application.

FIG. 8 shows another example of resources occupied by three UE groups. A UE group 1, a UE group 2, and a UE group 3 each occupies a different frequency domain resource in a same time domain resource, and frequency domain resources occupied by the UE groups are orthogonal and there is no frequency domain resource overlapping.

Figure 9:
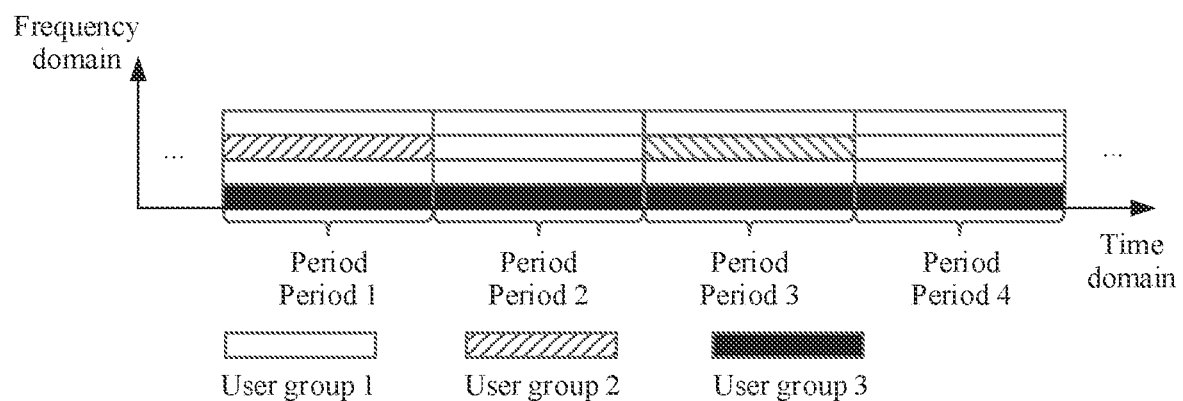
FIG. 9 is a schematic diagram of a resource of a user group according to an embodiment of this application.

FIG. 9 shows still another example of resources occupied by three UE groups. Frequency domain resources occupied by a UE group 1 in different time domain resources are not fixed. For example, the UE group 1 occupies two frequency domain resources in a period period 1, which are respectively a first frequency domain resource and a third frequency domain resource. The UE group 1 occupies three frequency domain resources in a period 2: a first frequency domain resource, a second frequency domain resource, and a third frequency domain resource. A frequency domain resource occupied by a UE group 3 in a different time domain resource is a fourth frequency domain resource. A UE group 2 periodically occupies a time domain resource and a frequency domain resource. For example, the UE group 2 occupies a second frequency domain resource in the period 1 and a period 3. In this case, the three UE groups periodically occupy resources by using four periods as a period.

In yet another example, the periodic resource allocated to each UE group may be a time domain resource and/or a frequency domain resource with a fixed time interval. Each UE group has a corresponding resource pool. Resources in the resource pool are periodic resourced allocated to the UE group for SL communication. In other words, the resource pool includes time domain resources and/or frequency domain resources with a fixed time interval.

FIG. 7 shows the example of a status of the resources allocated to the three UE groups in four periods. A resource pool corresponding to the UE group 1 may include periodic resources with a time interval of one period. A resource pool corresponding to the UE group 2 may include periodic resources with a time interval of three periods. A resource pool corresponding to the UE group 3 may include periodic resources with a time interval of three periods.

FIG. 8 shows the another example of a status of the resources allocated to the three UE groups in four periods. A resource pool corresponding to the UE group 1 may include a plurality of frequency domain resources in each period. A resource pool corresponding to the UE group 2 may include a frequency domain resource in each period. A resource pool corresponding to the UE group 3 may include a frequency domain resource in each period.

FIG. 9 shows the still another example of a status of the resources allocated to the three UE groups in a period of four periods. A resource pool corresponding to the UE group 1 may include first and third frequency domain resources in the period 1 and the period 3 and first, second, and third frequency domain resources in the period 2 and the period 4 in each period: or it may be considered that two periods are used as one period. In this case, a resource pool corresponding to the UE group 1 may include first and third frequency domain resources in the period 1 and first, second, and third frequency domain resources in the period 2 in each period.

Figure 10:
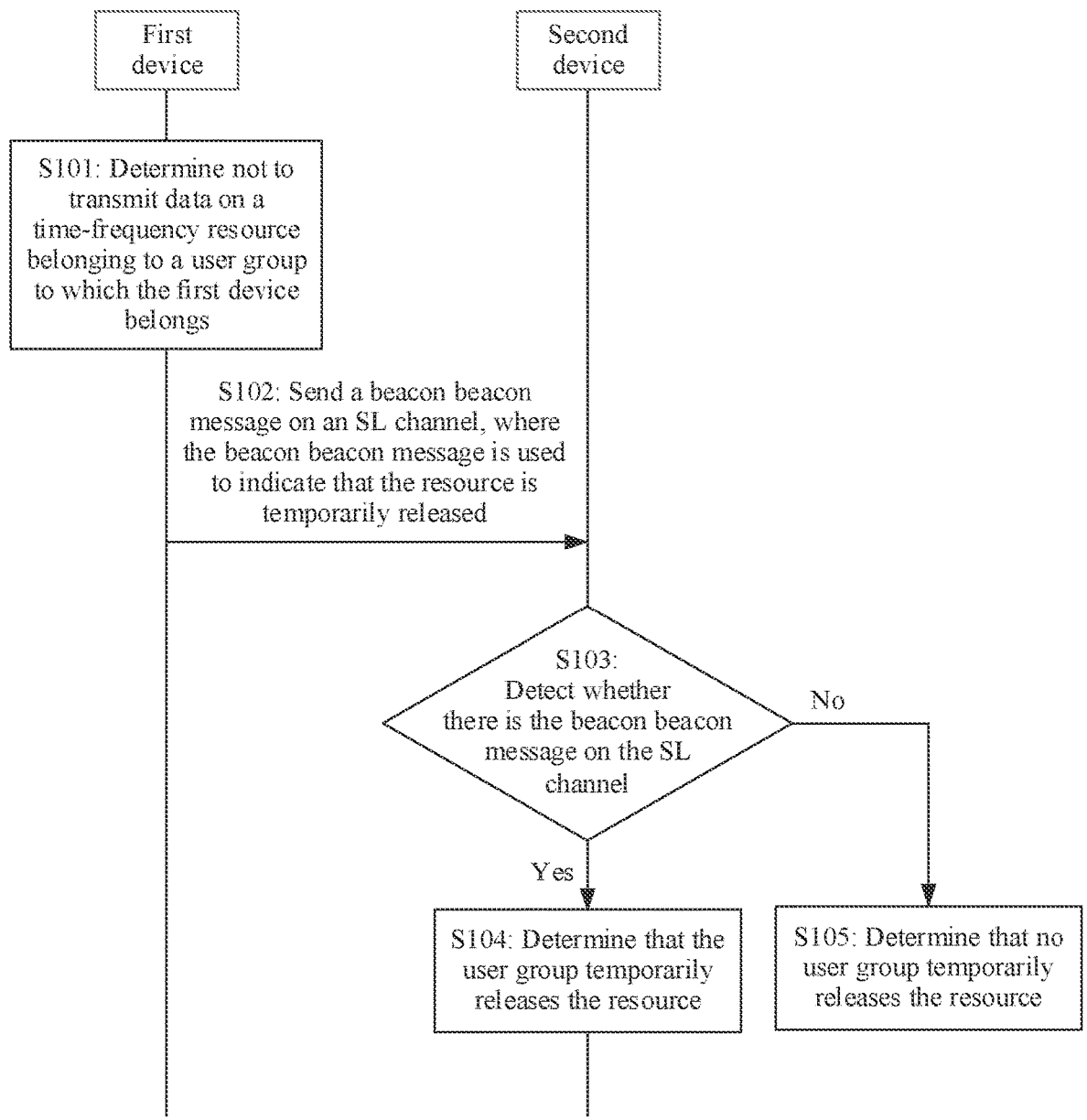
FIG. 10 is a schematic flowchart of a resource processing method according to an embodiment of this application.

First, an embodiment of this application provides a resource processing method, and a beacon (beacon) message is used to indicate resource release. FIG. 10 is a schematic diagram of interaction between a first device and a second device for implementing the resource processing method. The method includes the following steps.

Step S101: The first device determines not to transmit data on a time-frequency resource belonging to a user group to which the first device belongs.

For ease of description, the user group to which the first device belongs is denoted as a first UE group. The time-frequency resource belonging to the user group to which the first device belongs is a time-frequency resource allocated to the first UE group. The first UE group may dispose of the time-frequency resource belonging to the first UE group, for example, use, not use, or release the tune-frequency resource.

For example, the first device may be a GH in the first UE group.

For another example, the first device may alternatively be any SL UE in the first UE group.

Step S102: The first device sends a beacon beacon message on an SL channel, where the beacon beacon message is used to indicate that the resource is temporarily released.

Step S103: The second device detects whether there is the beacon beacon message on the SL channel. If there is the beacon beacon message, step S104 is performed; or if there is no beacon beacon message, step S105 is performed.

For example, the second device may be SL UE that is in a second UE group and that needs to occupy a temporarily released resource for data transmission.

For another example, the second device may alternatively be a GH in the second UE group.

Optionally, the second UE group is a UE group that needs to occupy a temporarily released resource for data transmission.

Step S104: The second deice determines that the user group temporarily releases the resource.

In a possible implementation, when determining that the UE group temporarily releases the resource, the second device notifies SL-UE in the second UE group that the SL-UE can occupy the temporarily released time-frequency resource to transmit data.

Step S105: The second device determines that no user group temporarily releases the resource.

Figure 11A:
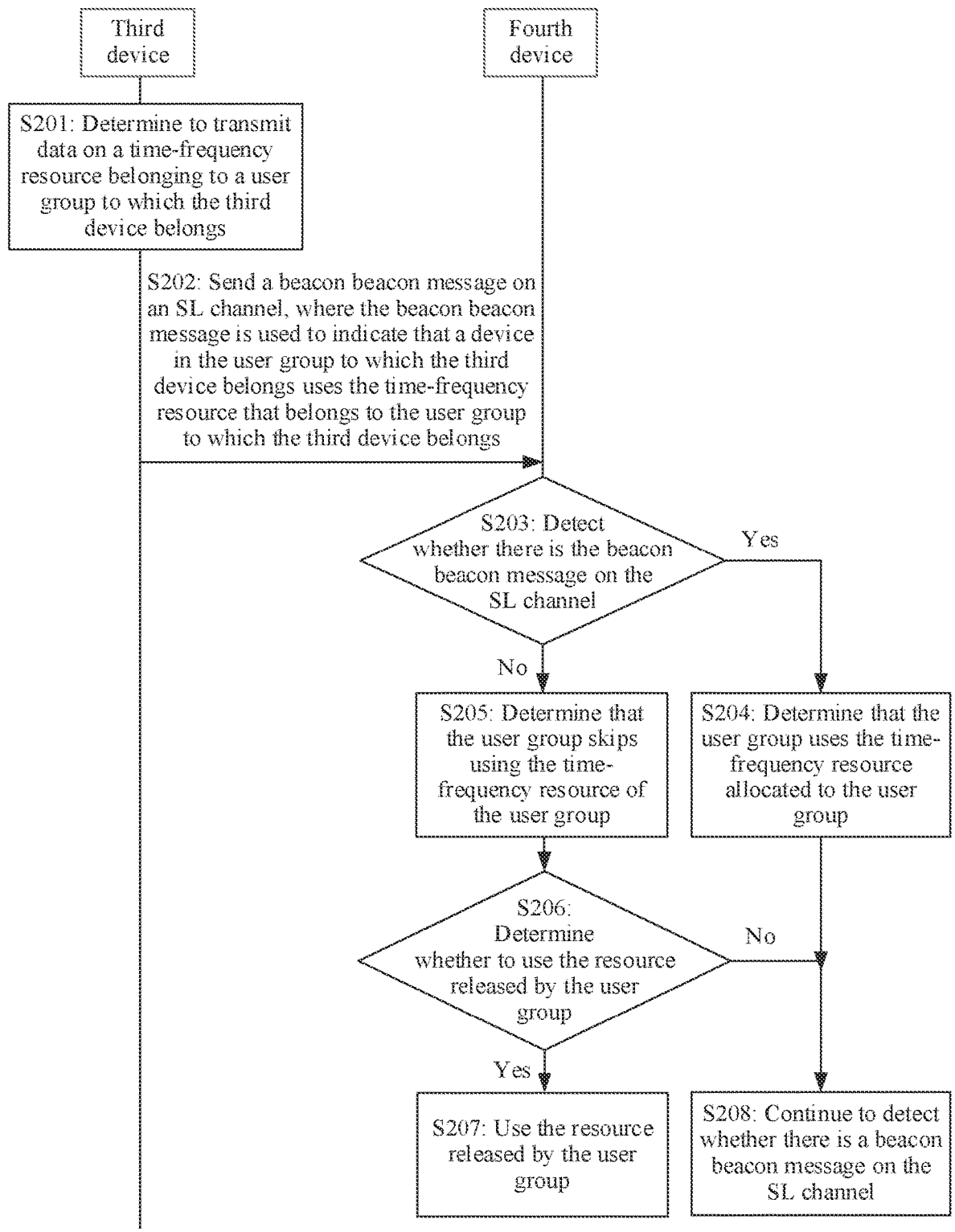
FIG. 11(a) is a schematic flowchart of another resource processing method according to an embodiment of this application.

An embodiment of this application further provides a resource processing method, to indicate resource occupation by using a beacon message. FIG. 11(a) is a schematic diagram of interaction between a third device and a fourth device for implementing the resource processing method. The method includes the following steps.

Step S201: The third device determines to transmit data on a time-frequency resource belonging to a user group to which the third device belongs.

During specific implementation, the user group to which the third device belongs uses a time-frequency resource allocated to the third UE group. The third UE group may dispose of the time-frequency resource belonging to the third UE group, for example, use, not use, or release the time-frequency resource. The time-frequency resource of the third UE group is used by SL-UE in the third UE group to perform intra-group data transmission, or may be used to transmit data to a device outside the group.

For example, the third device may be a GH in the third UE group. The GH needs to occupy the time-frequency resource of the third UE group to transmit the data, or the GH determines that any SL UE in the third UE group needs to occupy the time-frequency resource of the third UE group to transmit the data.

For another example, the third device may alternatively be any SL UE that is in the third UE group and that needs to occupy the time-frequency resource of the third UE group for data transmission.

Step S202: The third device sends a beacon beacon message on an SL channel, where the beacon beacon message is used to indicate that a device in the user group to which the third device belongs uses the time-frequency resource that belongs to the user group to which the third device belongs.

The SL UE in the third UE group may use all time-frequency resources belonging to the user group to which the third device belongs. The SL UE in the third UE group may also use a part of the time-frequency resource belonging to the user group to which the third device belongs.

In step S201, the third device determines that a time-frequency resource belonging to the user group to which the third device belongs may be denoted as a first resource. A second resource also belongs to the user group to which the third device belongs, and a time domain location of the second resource is after a time domain location of the first resource. The second resource in the time-frequency resource of the third UE group may be temporarily released for use by a device in another UE group. The temporarily released second resource in the time-frequency resource of the third UE group may be carried in the beacon message.

It should be understood that the beacon message sent by the SL UE in the third UE group directly indicates that the first resource belonging to the third UE group is not released. Therefore, resource release configuration information carried in the beacon message takes effect when the third UE group does not send a beacon message that is used to indicate the device in the user group to which the third device belongs to use the second resource that is after the first resource in a time-frequency location. Herein, the meaning that takes effect may mean that a device in the another user group may determine to use the second resource based on the resource release configuration information carried in the beacon message used to indicate that the first resource belonging to the third UE group is not released.

In a possible implementation, the beacon message sent by the third device carries the resource release configuration information. For example, the third device determines to occupy some of the allocated time-frequency resources to transmit data, and information about the other time-frequency resources that are not used for data transmission may be carried in the beacon message.

In an example description, the resource release configuration information carried in the beacon message sent by the third device includes a resource release duration set.

The time-frequency resource of the third UE group may include a plurality of time units. A resource of a period of time may be represented by using several time units. For example, duration of a resource is 0.25 time units.

The resource release duration set may include at least one piece of resource release duration (also a quantity of time units). The resource release duration may be represented by a value, and the resource release duration is a quantity of (the value) time unit resources in a predetermined time direction.

For example, the predetermined time direction is the same as a time domain direction. The SL UE in the UE group uses a latter resource in the time-frequency resource of the UE group, and may release a former resource in the time-frequency resource of the UE group, so that SL UE in the another UE group can use the former resource. For example, the resource release duration is values such as 0.25, 1, 1.5, and 4, which respectively represent 0.25 time units, 1 time unit, 1.5 time units, and 4 time units at the beginning of the time-frequency resource of the third UE group that are temporarily released.

For another example, the predetermined time direction is opposite to a time domain direction. The SL UE in the UE group uses a former resource in the time-frequency resource of the UE group, and may release a latter resource in the time-frequency resource of the UE group, so that SL UE in the another UE group can use the latter resource. For example, the resource release duration is values such as 0.25, 1, 1.5, and 4, which respectively represent the last 0.25 time units, 1 time unit, 1.5 time units, and 4 time units in the time-frequency resource of the third UE group that are temporarily released.

In another example description, the resource release configuration information carried in the beacon message sent by the third device includes a UE group set.

The resource release configuration information carried by the third device in the beacon message includes the UE group set, and the UE group set includes identifiers of one or more UE groups. The third device may provide time-frequency resources that are not used for data transmission for the one or more specified UE groups for use, and add the identifiers of the one or more specified UE groups to the UE group set.

For example, the identifiers of the UE groups are numbers agreed on by a plurality of UE groups that use a same SL channel, and each UE group has a unique corresponding number, for example, 1, 2, 3, 4, 5, a, b, c, d, e, or f.

For another example, the identifiers of the UE groups are identifiers of GHs in a plurality of UE groups that use a same SL channel.

The identifier of the UE group may be predetermined. For example, a GH in each UE group notifies a GH in another UE group of an identifier of the UE group, so that the GH in each UE group can learn the identifiers of the plurality of UE groups that use the same SL channel. For another example, the identifier of each UE group may be allocated by a base station. In addition, the base station notifies the GH of each UE group of the identifier of the UE group that uses the same SL channel.

For example, when a time-frequency resource is allocated to each UE group, each UE group may determine that a resource of the group is used by one or more UE groups after the resource is released, and notify a UE group that can use the temporarily released resource of the group. For example, if the third UE group specifies that a fourth UE group and a fifth UE group use all or a part of the resource temporarily released by the third UE group, another UE group except the fourth UE group and the fifth UE group cannot occupy all or a part of the resource temporarily released by the third UE group.

In still another example description, the resource release configuration information carried in the beacon message sent by the third device includes a resource release frequency set.

The time-frequency resource of the third UE group may include a plurality of frequency resources, and the frequency resource may be implemented as a sub-channel (sub-channel) resource of an SL channel. In the time-frequency resource of the third UE group, there is one or more frequencies that are not occupied by a transmission pair to transmit the data. The third UE group can temporarily release these frequency resources for use by the SL UE in the another UE group.

The resource release configuration information carried in the beacon message may be the resource release frequency set. The resource release frequency set includes indication information of at least one sub-channel resource.

For example, indication information of a sub-channel resource may indicate a plurality of sub-channel resources. The indication information may include a start location of a sub-channel and a quantity of sub-channels. For example, the indication information is (20.4), where 20 represents that the start location of the sub-channel is 20 MHz, and 4 represents a quantity of consecutive sub-channels that are started from 20 MHz based on a preset frequency interval. Assuming that the preset frequency interval is 1 MHz, the four consecutive sub-channels are respectively 20 MHz to 21 MHz. 21 MHz to 22 MHz. 22 MHz to 23 MHz, and 23 MHz to 24 MHz. The SL UE in each UE group may learn of the preset frequency interval in advance. The resource release frequency set may also include a plurality of pieces of indication information, and the plurality of pieces of indication information may indicate a plurality of sub-channels with different start locations.

For another example, indication information of a sub-channel resource is in a one-to-one correspondence with the sub-channel resource. The indication information of the sub-channel resource may be a number of the sub-channel resource. The resource release sub-channel set may include one or more sub-channel numbers, where the sub-channel number may indicate one sub-channel, and the sub-channel number is in a one-to-one correspondence with the sub-channel. In addition, the SL UE in each UE group may learn of the correspondence between the sub-channel number and the sub-channel in advance. Similarly, the resource release frequency set may include one or more frequencies. The resource release frequency set may also include one or more frequency numbers, the frequency number may indicate one frequency, and the frequency number is in a one-to-one correspondence with the frequency. In addition, the SL UE in each UE group may learn of a correspondence between the frequency number and the frequency in advance.

The resource release configuration information carried in the beacon message sent by the third device may further include at least two types of the following information: the resource release duration set, the UE group set, and the resource release frequency set.

For example, the resource release configuration information carried in the beacon message may be the resource release duration set and the UE group set. The resource release duration set carried in the beacon message may include at least one resource release duration. The UE group set may include an identifier of at least one UE group. The UE group corresponding to the identifier of the UE group in the UE group set may occupy a resource, in the resource release duration set, corresponding to an order of any resource release duration in the resource release duration set.

For example, the UE group corresponding to the identifier of the UE group included in the UE group set may use, based on an order of the identifier of the UE group in the UE group set, a resource corresponding to a same order in the resource release duration set. It is assumed that a UE group set is {u1, u2, u3}, and a resource release duration set is {t1, t2, t3}. Any value in the resource release duration set represents a quantity of time units. For example, t1 being 5 represents first five time units, t2 being 7 represents first seven time units, and t3 being 9 represents first nine time units. Resources corresponding to a first order of the resource release duration set are time units 1 to 5, resources corresponding to a second order are time units 6 and 7, and resources corresponding to a third order are time units 8 and 9. An identifier of a UE group 1 is u1, an order of the identifier u1 in the UE group set is 1, and a device in the UE group 1 may occupy a resource corresponding to the first order of the resource release duration set. An identifier of a UE group 2 is u2, an order of the identifier u2 in the UE group set is 2, and a device in the UE group 2 may occupy a resource corresponding to the second order of the resource release duration set. An identifier of a UE group 3 is u3, an order of the identifier u3 in the UE group set is 3, and a device in the UE group 3 may occupy a resource corresponding to the third order of the resource release duration set.

For another example, the resource release configuration information carried in the beacon message may be the resource release frequency set and the UE group set. The resource release frequency set carried in the beacon message may include at least one frequency. The UE group set may include an identifier of at least one UE group. The UE group corresponding to the identifier of the UE group in the UE group set may occupy a resource, in the resource release frequency set, corresponding to an order of any frequency in the resource release frequency set.

For example, the UE group corresponding to the identifier of the UE group included in the UE group set may use, based on an order of the identifier of the UE group in the UE group set, a frequency corresponding to a same order in the resource release frequency set. The UE group set is {u1, u2, u3}, and the resource release frequency set is {p1, p2, p3}. An identifier of a UE group 2 is u2, an order of the identifier u2 in the UE group set is 2, and a device in the UE group 2 may occupy a resource corresponding to the order 2 in the resource release frequency set, namely, a resource corresponding to p2.

For till another example, the resource release configuration information carried in the beacon message may be the resource release duration set and the resource release frequency set. The resource release duration set carried in the beacon message may include at least one resource release duration. The resource release frequency set carried in the beacon message may include at least one frequency. The SL UE in the another UE group may occupy a resource corresponding to any frequency in the resource release frequency set, and duration in which the SL UE occupies the resource corresponding to the frequency is any resource release duration in the resource release duration set. In other words, the duration in which the SL UE occupies the resource corresponding to the frequency needs to meet a specific duration limit. The duration in which the SL UE occupies the resource corresponding to the frequency should be any resource release duration in the resource release duration set, and cannot be duration outside the resource release duration set.

Further, there may be a correspondence between the resource release duration in the resource release duration set and the frequency in the resource release frequency set, and the correspondence is carried in the beacon message.

In a possible implementation, the correspondence between the resource release duration in the resource release duration set and the frequency in the resource release frequency set is index information. The beacon message may further carry index information of each frequency in the resource release frequency set and each resource release duration in the resource release duration set. The SL UE in the another UE group may determine, based on the index information carried in the beacon message, a frequency corresponding to each resource release duration.

For example, a resource release duration set is {t1, t2, t3}, a resource release frequency set is {p1, p2, p3}, and a resource corresponding to a frequency p1 in time-frequency resources corresponding to t1 and t2 is released, resources corresponding to frequencies p2 and p3 are not released. Resources corresponding to frequencies p2 and p3 in the time-frequency resource corresponding to t3 are released, a resource corresponding to p1 is not released, and index information of each resource release duration in the resource release duration set and each frequency in the resource release frequency set may be {11, 12, 23, 33}. A quantity of temporarily released time-frequency resources may be determined based on a quantity of elements in the index information, where each element includes two characters, a first character is an element order of a duration resource in the resource release duration set, a second character is an element order of a frequency resource in the resource release frequency set, and each element character may uniquely point to one time-frequency resource. It should be noted that the index information may alternatively be set in another form. A form of the index information is not specifically limited in this application.

In a possible implementation, the resource release configuration information carried in the beacon message sent by the third device may be pre-configured, and the resource release configuration information carried in a beacon message sent each time is the same.

In a possible implementation, the resource release configuration information carried in the beacon message sent by the third device may be determined based on a status of a time-frequency resource used by each transmission pair in the third UE group after the third device determines that the SL UE in the third UE group uses the allocated time-frequency resource.

In a possible implementation, the beacon message sent by the third device is in a sequence form.

During specific implementation, the third device may perform cyclic shift on a preset root sequence to generate the beacon message.

In an example, the preset root sequence may be a Zadoff-Chu sequence. When performing code division multiplexing on the root sequence, the third device may use a cyclic shift (cyclic shift) manner. Zadoff-Chu sequences have good autocorrelation. Sequences obtained after the Zadoff-Chu sequence is cyclically moved by any bit are irrelevant to each other. In addition, because an amplitude of any Chu sequence is constant, a beacon message of each frequency in an SL channel may have a same amplitude, and the another UE group is more likely to detect the beacon message.

For another example, a sequence form of the beacon message sent by the third device is presented as a comb function comb(x), a unit pulse sequence, or a unit pulse comb sequence in frequency domain. Because the sequence form of the beacon message is presented as a repeated waveform in time domain, the beacon message is more likely to be detected, and there is a higher success rate of decoding the beacon message. A pulse interval may be configured based on an application scenario.

In a possible implementation, the third device includes, in a cyclic shift manner, the resource release configuration information in the beacon message.

In a possible implementation, when performing step S201, the third device may send the beacon message at a first location on the SL channel. The first location may be a predetermined time domain location and/or frequency domain location.

Figure 12:
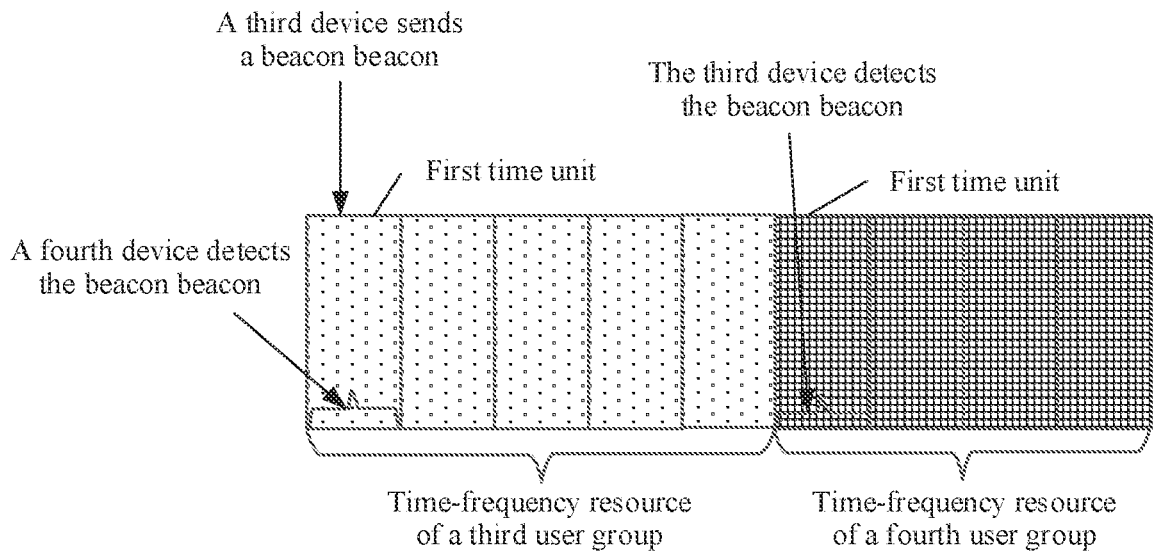
FIG. 12 is a schematic diagram of sending a beacon message according to an embodiment of this application.

For example, when the third device sends the beacon message on the SL channel, the third device may send the beacon message on the time-frequency resource of the third UE group. For example, the third device may send the beacon message at any time domain location in a first time unit in the time-frequency resource of the third UE group. That is, the first location is any time domain location in the first time unit in the time-frequency resource of the third user group (UE group). As shown in FIG. 12, the third device sends the beacon message at any time domain location in the first time unit in the time-frequency resource of the third UE group.

If a preset time-frequency location range is further set before a time-frequency resource of each UE group on the SL channel, the preset time-frequency location range may be used to transmit a beacon message sent by any UE group, and a resource in the preset time-frequency location range does not belong to any UE group. Alternatively, the preset time-frequency location range may have no intersection with a time-frequency resource in a first time unit and a time-frequency resource in a last time unit in a time-frequency resource of any UE group.

Figure 13:
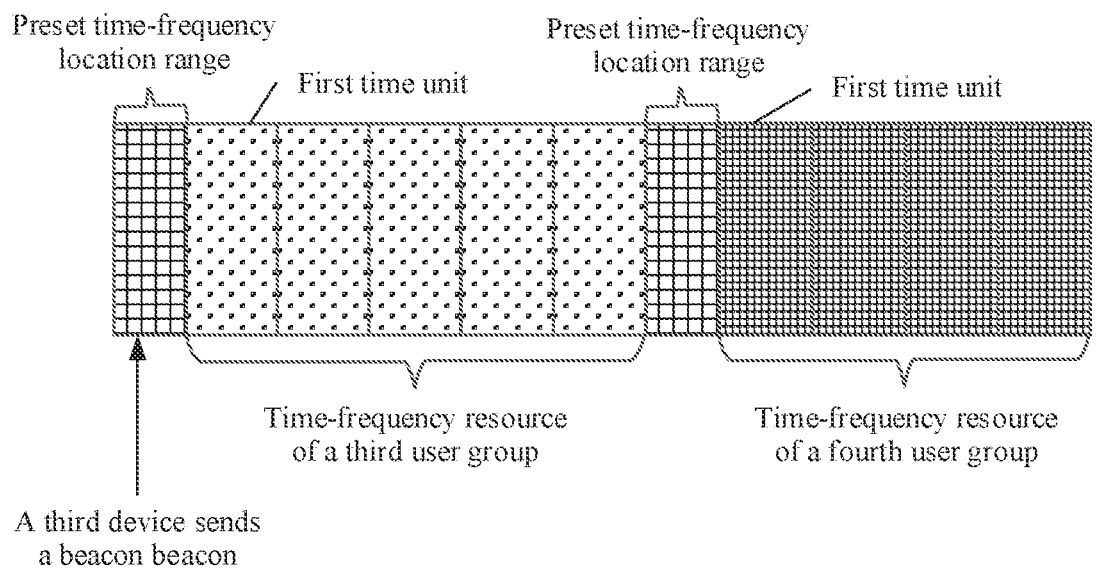
FIG. 13 is another schematic diagram of sending a beacon message according to an embodiment of this application.

For example, when the third device sends the beacon message on the SL channel, the third device may also send the beacon message at any time domain location in a preset time-frequency location range that is closest to and before the first time unit in the time-frequency resource of the third UE group. As shown in FIG. 13, the third device may send the beacon message at any time domain location in the preset time-frequency location range before the first time unit in the time-frequency resource of the third user group (UE group). That is, the first location is the any time domain location in the preset time-frequency location range before the first time unit in the time-frequency resource of the third UE group.

In another example, the third device may send the beacon message on a preset quantity of resource elements (resource elements, REs) on a physical sidelink shared channel (physical sidelink shared channel, PSSCH) in a preset time-frequency location range that is closest to and before the first time unit in the time-frequency resource of the third UE group, and the preset quantity may be any value greater than zero.

Locations of the preset quantity of REs may be determined based on a frequency of the cyclic shift that carries the beacon message, and an interval $Offset_{Beacon}$ between the REs may be set based on the actual application scenario. A sequence interval and a length of the beacon message may be set based on a location of a demodulation reference signal (demodulation reference signal, DMRS) of the PSSCH.

Figure 14:
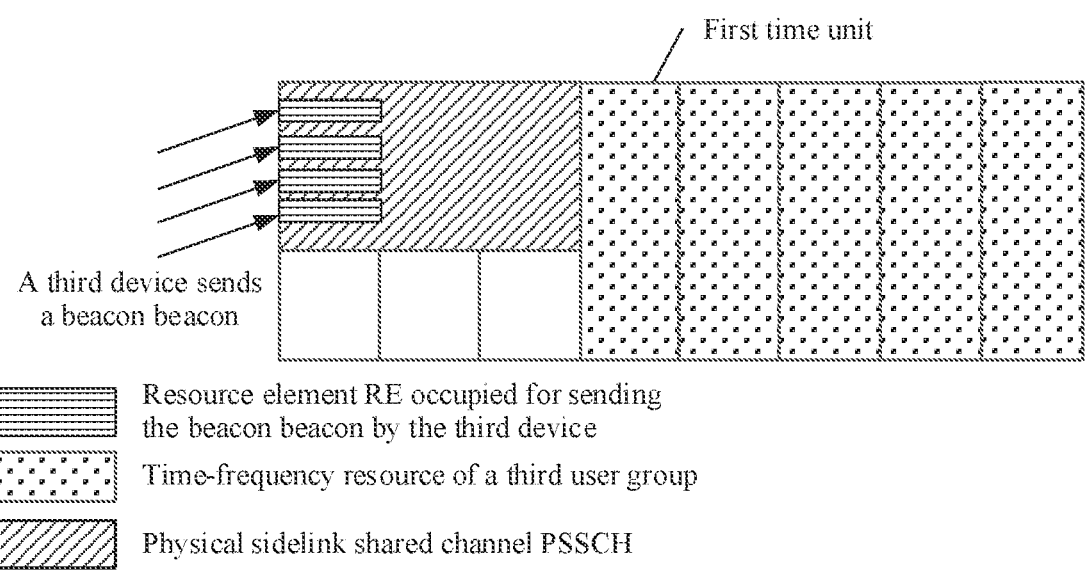
FIG. 14 is still another schematic diagram of sending a beacon message according to an embodiment of this application.

As shown in FIG. 14, the frequency domain location at which the third device sends the beacon message may be four REs on the PSSCH in the preset time-frequency location range before the first time unit in the time-frequency resource of the third user group (UE group). The third device may use the four REs to carry the beacon message.

In a possible implementation, before the third device sends the beacon message at the first location on the SL channel, the third device may determine, through negotiation with SL UEs in a plurality of UE groups, the first location at which the beacon message is sent. Alternatively, the third device may determine the first location by using configuration information notified by a base station. The first location at which the third device sends the beacon message is also configured by another user terminal, for example, a user terminal that sets up the third UE group (for example, a user of the group head in the third UE group). If the SL UEs in the plurality of UE groups that use the same SL channel resource are from a same vendor, the first location at which the third device sends the beacon message may be configured by the vendor.

In a possible implementation, if no data is transmitted on the first resource of the third UE group for each transmission pair in the third UE group, the third device does not send the beacon message on the SL channel. The third device may be any SL UE in the third UE group.

Step S203: The fourth device detects whether there is the beacon beacon message on the SL channel, and if there is the beacon beacon message, performs step S204, or if there is no beacon beacon message, performs step S205.

For example, the fourth device may be a GH in the fourth UE group.

For another example, the fourth device may alternatively be any SL UE in the fourth UE group.

Optionally, SL UE in the fourth UE group needs to use the time-frequency resource of the third UE group to transmit data, and the fourth device detects whether the SL-UE in the third UE group sends the beacon signal on the SL channel.

In a possible implementation, the fourth UE group is a UE group that needs to occupy a temporarily released resource for data transmission, for example, aperiodic service data transmission or periodic service data transmission.

In another possible implementation, the fourth UE group is a specified UE group that can transmit data on the time-frequency resource of the third UE group.

In still another possible implementation, the fourth UE group is one of a plurality of specified UE groups that transmit data on the time-frequency resource of the third UE group.

In yet another possible implementation, an identifier of the fourth UE group is in a UE group set included in resource release configuration information carried in a beacon message historically sent by the third UE group, and the fourth UE group may transmit data by using all or a part of the time-frequency resource released by the third UE group.

The fourth device detects the beacon message at a second location on the SL channel, and the fourth device may determine the second location based on the predetermined first location at which the third device sends the beacon message.

If the first location is the predetermined time domain location and/or frequency domain location, the fourth device detects the beacon message at the second location that is the same as the first location.

If the first location is the any time-frequency location in the first time unit in the time-frequency resource of the third UE group, the fourth device detects the beacon message in the first time unit in the time-frequency resource allocated to the third UE group. That is, the second location is any time-frequency location in the first time unit in the time-frequency resource of the third UE group.

If the first location is the any time-frequency location in the preset time-frequency location range that is closest to and before the first time unit in the time-frequency resource of the third UE group, the fourth device detects the beacon message in the preset time-frequency location range. That is, the second location is the any time-frequency location in the preset time-frequency location range that is closest to and before the first time unit in the time-frequency resource of the third UE group.

As shown in FIG. 13, the fourth device may detect the beacon message in the preset time-frequency location range before the first time unit in the time-frequency resource of the third UE group. If the first location is one of the preset quantity of REs on the PSSCH in the preset time-frequency location range that is closest to and before the first time unit in the time-frequency resource of the third UE group, the fourth device detects the beacon message on the PSSCH in the time-frequency resource of the third UE group, or detects the beacon message on the preset quantity of REs on the PSSCH in the time-frequency resource of the third UE group. That is, the second location is any RE or frequency on the PSSCH in the time-frequency resource of the third UE group.

Step S204: The fourth device determines that the user group uses the time-frequency resource of the user group.

The fourth device detects the beacon message, and may determine that the SL UE in the third UE group transmits the data on the allocated time-frequency resource.

Further, the fourth device stores the detected beacon message; or the fourth device determines whether the detected beacon message carries the resource release configuration information. If determining that the detected beacon message carries the resource release configuration information, the fourth device stores the beacon message; or if determining that the detected beacon message carries no resource release configuration information, the fourth device discards the beacon message.

Step S205: The fourth device determines that the user group skips using the time-frequency resource of the user group.

If the fourth device detects no beacon message on the SL channel, the fourth device may determine that any SL UE in the UE group to which the current time-frequency resource belongs does not transmit data on the time-frequency resource or uses the time-frequency resource but does not interfere with each other.

Step S206: The fourth device determines whether to use the resource released by the UE group, and if the fourth device uses the resource, performs step S207 next, or if the fourth device skips using the resource, performs step S203 next.

The fourth device may determine, based on the beacon message historically sent by the UE group to which the current time-frequency resource belongs, whether to use the resource released by the UE group.

For example, if the fourth device does not detect, before this, the beacon message sent by any device in the third UE group, the fourth device determines not to use the current time-frequency resource released by the third UE group.

For another example, if the fourth device detects, before this, the beacon message sent by any device in the third UE group, the fourth device may determine whether the beacon message that is sent by any device in the third UE group and that is detected last time carries the resource release configuration information. If the resource release configuration information is carried, the fourth device may use, based on the resource release configuration information, the current time-frequency resource released by the third UE group. If the resource release configuration information is not carried, the fourth device may directly use the current time-frequency resource released by the third UE group.

Step S207: The fourth device uses the resource released by the UE group.

In an example description, the fourth device determines that the resource release configuration information carried in the beacon message that is sent by any device in the third UE group and that is most recently detected includes the resource release duration set. The fourth device may select one piece of resource release duration from the resource release duration set. The fourth device may notify a transmission pair that needs to transmit data in the fourth UE group to transmit data on a resource corresponding to the selected resource release duration.

In another example description, the fourth device determines that the resource release configuration information carried in the beacon message that is sent by any device in the third UE group and that is most recently detected includes the UE group set. The fourth device may determine whether an identifier of the current group, namely, the identifier of the fourth UE group, is in the UE group set. If the identifier of the fourth UE group is in the UE group set, the fourth device determines that the resource temporarily released by the third UE group may be used for data transmission.

In still another example description, the fourth device determines that the resource release configuration information carried in the beacon message that is sent by any device in the third UE group and that is most recently detected includes the resource release frequency set. The fourth device may select a frequency from the resource release frequency set. The fourth device may notify a transmission pair that needs to transmit data in the fourth UE group to transmit data on a resource corresponding to the selected frequency.

The fourth device determines that the resource release configuration information carried in the beacon message that is sent by any device in the third UE group and that is most recently detected includes at least two types of the following information:

the resource release duration set, the UE group set, and the resource release frequency set.

For example, the fourth device determines that the resource release configuration information carried in the beacon message that is sent by any device in the third UE group and that is most recently detected is the resource release frequency set and the UE group set. The resource release frequency set carried in the beacon message may include at least one frequency. The fourth device may determine whether an identifier of the current group, namely, the identifier of the fourth UE group, is in the UE group set. If determining that the identifier of the fourth UE group is in the UE group set, the fourth device may select a frequency from the resource release frequency set. The fourth device may notify a transmission pair that needs to transmit data in the fourth UE group to transmit data on a resource corresponding to the selected frequency.

For another example, the fourth device determines that the resource release configuration information carried in the beacon message that is sent by any device in the third UE group and that is most recently detected includes the resource release duration set and the UE group set. After the fourth device determines that the temporarily released resource carried in the beacon message includes the resource release duration and the UE group set, the fourth device may determine whether the identifier of the fourth UE group is in the UE group set. If the identifier of the fourth UE group is in the UE group set, the fourth device may select a piece of resource release duration from the resource release duration set. The fourth device may notify a transmission pair that needs to transmit data in the fourth UE group to transmit data on a resource corresponding to the selected resource release duration.

Step S208: The fourth device continues to detect whether there is a beacon beacon message on the SL channel.

If the fourth device determines that the current time-frequency resource is not released or the fourth device cannot use the released resource in the current time-frequency resource, the process of steps S203 to S207 may be repeatedly performed.

In an actual application scenario, a time-frequency resource of each UE group may have specific redundancy, to ensure requirements such as data retransmission and aperiodic data transmission. When a time-frequency resource of a UE group does not match an actual transmission requirement, for example, the time-frequency resource allocated to the UE group is greater than a time-frequency resource corresponding to the actual transmission requirement, a part of the time-frequency resource of the UE group is in an idle state, causing a waste of resources. For another example, when the time-frequency resource allocated to the UE group is less than the time-frequency resource required for actual transmission, a part of data of the UE group cannot be transmitted due to insufficient time-frequency resource. According to the resource processing method provided in this embodiment of this application, a temporary resource release mechanism is introduced in the SL transmission scenario. This can not only avoid signal interference, but also flexibly release the channel resource, can flexibly use the released channel resource to transmit the aperiodic service data, ensure delay QoS, and improve channel resource utilization.

In addition, the third UE group temporarily releases all or a part of the time-frequency resource allocated to the third UE group. If the third UE group does not specify that a UE group uses the resource temporarily released by the third UE group, the another UE group in the plurality of UE groups that use the same SL channel resource as the third UE group may determine, in a contention manner, whether the resource temporarily released by the third UE group can be occupied. The another UE group may also determine, in a polling manner, whether the resource temporarily released by the third UE group can be occupied.

For example, if the resource release configuration information carried in the beacon message sent by the third device includes the UE group set, a UE group in the UE group set may occupy, in a contention manner, the resource released by the third UE group.

For example, the SL UE (for example, the GH) in the another UE group contends for the temporarily released resource in N symbols after the second location for detecting the beacon message. The N symbols may include M sensing slots (sensing slots).

Figure 11B:
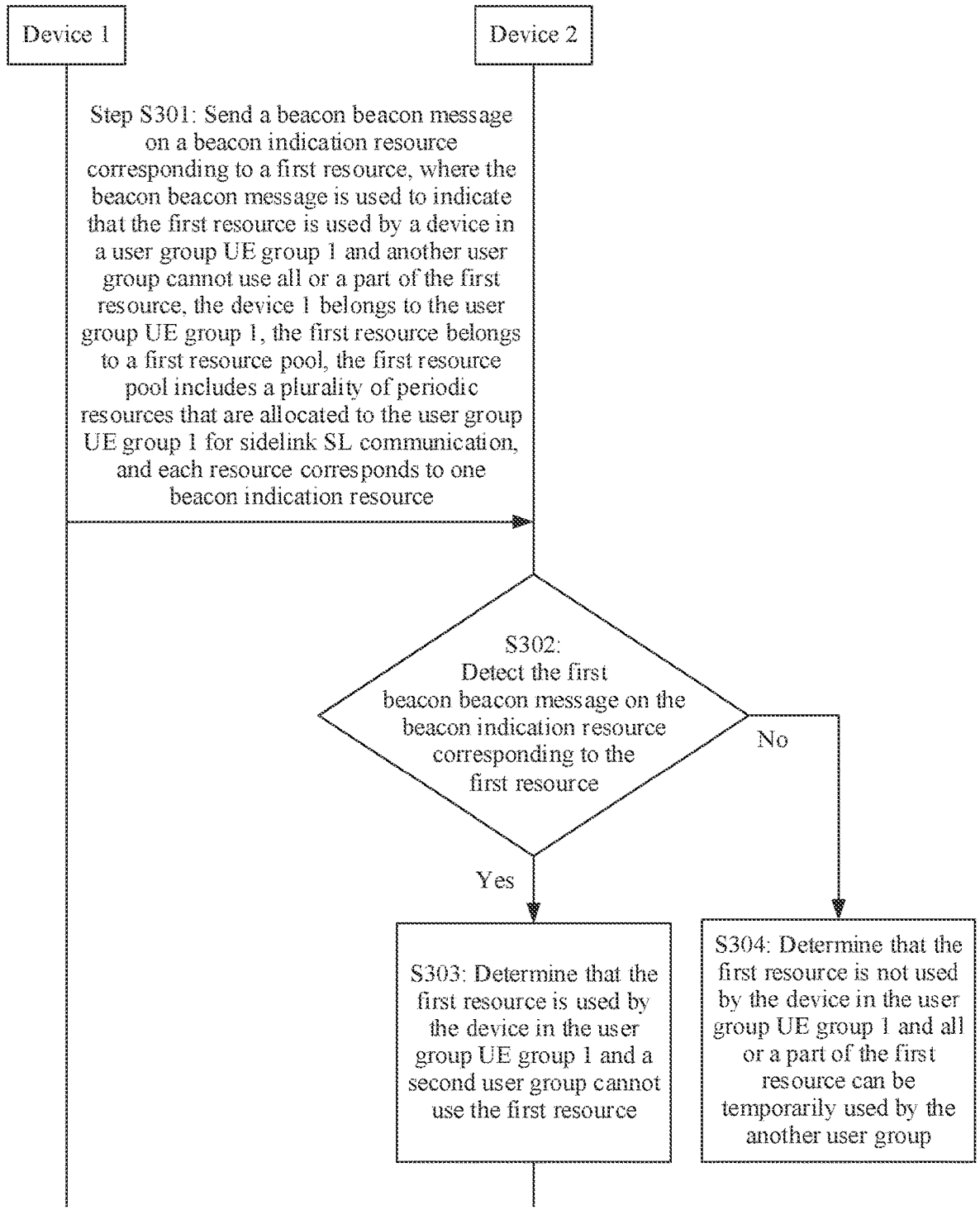
FIG. 11(b) is a schematic flowchart of another resource processing method according to an embodiment of this application.

An embodiment of this application further provides a resource processing method, to indicate resource occupation by using a beacon message. FIG. 11(b) is a schematic diagram of interaction between a device 1 and a device 2 for implementing the resource processing method. The method includes the following steps.

Step S301: The device 1 sends a beacon beacon message on a beacon indication resource corresponding to a first resource, where the beacon beacon message is used to indicate that the first resource is used by a device in a user group UE group 1 and another user group cannot use all or a part of the first resource, the device 1 belongs to the user group UE group 1, the first resource belongs to a first resource pool, the first resource pool includes a plurality of periodic resources that are allocated to the user group UE group 1 for sidelink SL communication, and each resource corresponds to one beacon indication resource.

Each UE group may have a corresponding resource pool. For example, the first resource pool corresponding to the UE group 1 may include a resource that belongs to the UE group 1 for SL communication, for example, a periodic time-frequency resource. The UE group 1 may dispose of the time-frequency resource belonging to the UE group 1, for example, use, not use, or release the time-frequency resource. The time-frequency resource of the UE group 1 is used by SL-UE in the UE group 1 to perform intra-group data transmission, or may be used to transmit data to a device outside the group. The device 1 may be a GH in the UE group 1. The GH needs to occupy the time-frequency resource of the UE group 1 to transmit the data, or the GH determines that any SL UE in the UE group 1 needs to occupy the time-frequency resource of the UE group 1 to transmit the data. Alternatively, the device 1 may be any SL UE that is in a third UE group and that needs to occupy the time-frequency resource of the UE group 1 for data transmission.

In this embodiment of this application, the device 1 skips sending the beacon message on the beacon indication resource corresponding to the first resource, so that a device in the another user group can determine that the first resource is not used by the device in the first user group and all or a part of the first resource can be temporarily used by the device in the another user group. For example, the device in the another user group may perform detection on the beacon message on the beacon indication resource corresponding to the first resource, and determine, when the beacon message is not detected, that the first resource is temporarily released by the UE group 1 and all or a part of the first resource may be temporarily used by the device in the another user group.

When determining that the UE group 1 uses the first resource, the device 1 may send the beacon message on the beacon indication resource corresponding to the first resource; or when determining that the UE group 1 skips using the first resource, the first device may skip sending the beacon message on the beacon indication resource corresponding to the first resource. For example, if the device 1 may determine that one device in the UE group 1 uses the first resource, the device 1 determines that the UE group 1 uses the first resource; or if the device 1 determines that none of the devices in the UE group 1 uses the first resource, the device 1 determines that the UE group 1 skips using the first resource.

In a possible implementation, the beacon indication resource corresponding to the first resource is orthogonal to a resource in a resource pool corresponding to at least one other user group. For example, a beacon indication resource corresponding to each resource in the first resource pool corresponding to the first user group is orthogonal to a resource in a resource pool corresponding to another user group. The device 1 may not use the resource in the resource pool corresponding to the another user group to send the beacon message, that is, skip using the resource belonging to the another user group. Optionally, the beacon indication resource corresponding to the first resource may be orthogonal to a resource occupied by a physical sidelink shared channel of the first user group.

In a possible implementation, the beacon message may carry configuration information of the first resource pool. The configuration information of the first resource pool may be used to indicate resource information of a resource that is in a second resource and that can be used by the another user group when the second resource meets a first condition. The second resource belongs to the first resource pool, a time domain location of a period corresponding to the second resource is after a time domain location of a period corresponding to the first resource, and the first condition is that the device 1 skips sending a beacon message on a beacon indication resource corresponding to the second resource.

The configuration information carried in the beacon message may be configuration information of the first resource pool corresponding to the UE group 1. The configuration information may be used to indicate the resource information of the temporarily released resource in the resource pool corresponding to the UE group 1. The temporarily released resource needs to meet a preset condition. For example, if the device 1 skips sending the beacon message in the beacon indication resource corresponding to the second resource, the second resource may be used as the resource temporarily released by the UE group 1. The another user group may determine, by detecting no beacon message in the beacon indication resource corresponding to the second resource, that the second resource is temporarily released.

In this embodiment of this application, for example, if the first resource corresponds to a first period, and the second resource corresponds to a second period, the time domain location of the second period is after the time domain location of the first period. Because the second resource meets the condition that the device 1 skips sending the beacon message on the beacon indication resource corresponding to the second resource, the second resource may be used as the resource temporarily released by the UE group 1. It should be understood that the configuration information carried in the beacon message sent by the device 1 in the beacon indication resource corresponding to the first resource may be used to indicate the resource information of the temporarily released resource whose time domain location is after the time domain location of the period corresponding to the first resource, for example, indicate the resource information of the second resource.

It should be understood that the SL UE in the UE group 1 sends the beacon message to directly indicate that the first resource belonging to the UE group 1 is not released, and the configuration information carried in the beacon message takes effect when the second resource meets the condition, where the condition is that the time-frequency location of the second resource is after that of the first resource, and the UE group 1 skips sending the beacon message used to indicate the device in the UE group 1 to use the second resource. Herein, the meaning that takes effect may mean that the device in the another user group may determine to use the second resource based on the configuration information carried in the beacon message used to indicate that the first resource of the UE group 1 is not released.

The resource information indicated by the configuration information carried in the beacon message sent by the device 1 may include a target resource unit set and/or a target user group set. The target resource unit set may include at least one resource unit in the second resource. The target user group set may include an identifier of at least one user group, and the identifier of the user group is an identifier of a user group that can use a resource in the target resource unit set.

In a possible design, the target resource unit set may include a resource release duration set; or the target resource unit set includes a resource release frequency domain set; or the target resource unit set includes the resource release duration set and the resource release frequency domain set.

For example, the resource release duration set may include at least one time unit quantity, a first time unit quantity is used to indicate a quantity of time units included in a resource that is in the second resource and that can be used by the device in the another user group, and the first time unit quantity belongs to the at least one time unit quantity. In this embodiment of this application, the time unit may include but is not limited to a radio frame, a subframe, a slot, and a symbol.

Each periodic time-frequency resource included in the first resource pool may include a plurality of time units. A resource of a period of time may be represented by using several time units. For example, duration of a resource is 0.25 time units.

The resource release duration set may include at least one piece of resource release duration (also a quantity of time units). For example, the resource release duration may be represented by a value, and the resource release duration is a quantity of (the value) time unit resources in a predetermined time direction. It is assumed that the resource release duration set is {t1, t2, t3}. The resource release duration set includes resource release duration t1, t2, and t3. Any value in the resource release duration set represents a quantity of time units. For example, t1 being 5 represents first five time units, t2 being 7 represents first seven time units, and t3 being 9 represents first nine time units.

For another example, the resource release duration may be represented by a value. First resource release duration in the resource release duration set may be time unit resources whose quantity is the first resource release duration in the predetermined time direction. In two adjacent pieces of resource release duration, the latter piece of resource release duration is time unit resources corresponding to the latter piece of resource release duration after a quantity of resources corresponding to the former piece of resource release duration in the predetermined time direction. It is assumed that the resource release duration set is {t4, t5, t6}. The resource release duration set includes resource release duration t4, t5, and t6. Any value in the resource release duration set represents a quantity of time units. For example, a resource represented by t4 being 3 is a time unit 1 to a time unit 3, t5 being 2 represents two time units after the time unit 1 to the time unit 3, that is, a time unit 4 and a time unit 5, t6 being 4 represents four time units after the time unit 4 and the time unit 5, that is, a time unit 6 to a tune unit 9.

For another example, the resource release duration set may include the at least one time unit proportion, and the time unit proportion indicates the ratio of the time unit included in the resource that is in the second resource and that can be used by the device in the another user group to the total quantity of time units in the second resource.

A time unit proportion a may represent a ratio of in time units to all n time units included in one periodic resource. The resource release duration set may include at least one time unit proportion a. The device in the another user group may determine, based on the time unit proportion a and all the n time units in the periodic resource, that there are in time units corresponding to the time unit proportion a.

For example, the quantity of time units corresponding to the time unit proportion may be the quantity of time unit resources in the predetermined time direction. It is assumed that the resource release duration set is {a1, a2, a3}. The resource release duration set includes time unit proportions a1, a2, and a3. For example, a1 corresponds to m1 time units, and m1 represents first m1 time units; a2 corresponds to m2 time units, and m2 represents first m2 time units; and a3 corresponds to m3 time units, and m3 represents first m3 time units.

For another example, a quantity of time units corresponding to a first time unit proportion in the resource release duration set is the quantity of time unit resources in the predetermined time direction. In two adjacent time unit proportions, a quantity of time units corresponding to a latter time unit proportion is the quantity of time unit resources equal to the quantity of the time units corresponding to the latter time unit proportion after a quantity of time units corresponding to a former time unit proportion in the predetermined time direction. It is assumed that the resource release duration set is (a4, a5, a6), and the resource release duration set includes time unit proportions a4, a5, and a6, a4 corresponds to m4 time units, and resources represented are a time unit 1 to a time unit m4; a5 corresponds to m5 time units, and resources represented are m5 time units after the time unit 1 to the time unit m4, that is, a time unit m4+1 to a time unit m4+m5; and a6 corresponds to m6 time units, and resources represented are m6 time units after the time unit m4+1 to the time unit m4+m5, that is, a time unit m4+m5+1 to a time unit m4+m5+m6.

The resource release frequency domain set includes indication information corresponding to at least one frequency domain resource in the second resource, and the indication information indicates a frequency domain resource that can be used by the device in the another user group. For example, the frequency domain resource may be a channel resource. The indication information corresponding to the frequency domain resource may indicate or represent the channel resource. Optionally, the channel resource may be the sub-channel resource in the foregoing embodiment.

In a possible implementation, the indication information corresponding to the frequency domain resource may be represented by a value. For example, the resource indicated by the indication information corresponding to the frequency domain resource may be a quantity of (the value) channel resources in a preset frequency domain direction. It is assumed that the resource release frequency domain set is {p1, p2, p3}. The resource release frequency domain set includes resource release duration p1, p2, and p3. Any value in the resource release frequency domain set represents a quantity of channel resources. For example, p1 being 5 represents first five channel resources, p2 being 7 represents first seven channel resources, and p3 being 9 represents first nine channel resources.

For another example, the indication information corresponding to the frequency domain resource may be represented by a value, and a resource indicated by first piece of indication information in the resource release frequency domain set may be channel resources whose quantity is the first piece of indication information in the preset frequency domain direction. In two pieces of adjacent indication information, a resource indicated by a latter piece of indication information is channel resources whose quantity is last indication information of a resource indicated by a former piece of indication information in a preset frequency domain direction. It is assumed that the resource release frequency domain set is {p4, p5, p6}, and the resource release duration set includes resource release duration p4, p5, and p6. Any value in the resource release duration set represents a quantity of channel resources. For example, resources represented by p4 being 3 are a channel resource 1 to a channel resource 3, p5 being 2 represents two channel resources after the channel resource 1 to the channel resource 3, namely, a channel resource 4 and a channel resource 5, p6 being 4 represents four channel resources after the channel resource 4 and the channel resource 5, namely a channel resource 6 to a channel resource 9.

In another possible implementation, indication information corresponding to a frequency domain resource may be a number of a released channel resource, or an order of the released channel resource in a predetermined order of a plurality of channel resources.

In a possible implementation, the resource information indicated by the configuration information carried in the beacon message sent by the device 1 may include at least two types of the following information: the resource release duration set, the UE group set, and the resource release frequency domain set.

For example, the resource indicated by the configuration information carried in the beacon message may include the resource release duration set and the UE group set. The resource release duration set may include at least one piece of resource release duration or a time unit proportion. The UE group set may include an identifier of at least one UE group.

A UE group whose identifier of the UE group is in the UE group set may occupy, based on an order of the identifier of the UE group in the UE group set, a resource corresponding to resource release duration in the same order or a resource corresponding to a time unit proportion in the same order in the resource release duration set.

For example, the resource release duration set includes at least one resource release duration. The UE group corresponding to an identifier of the UE group included in the UE group set may use, based on an order of the identifier of the UE group in the UE group set, a resource in the same order in the resource release duration set. It is assumed that the UE group set is {u1, u2, u3}, the resource release duration set is {t4, t5, t6}, and the resource release duration set includes resource release duration t4, t5, and t6. Any value in the resource release duration set represents a quantity of time units. For example, a resource represented by t4 being 3 is a time unit 1 to a time unit 3, t5 being 2 represents two time units after the time unit 1 to the time unit 3, that is, a time unit 4 and a time unit 5, t6 being 4 represents four time units after the time unit 4 and the time unit 5, that is, a time unit 6 to a time unit 9. A resource corresponding to a first order of the resource release duration set is the time unit 1 to the time unit 3, a resource corresponding to a second order is the time unit 4 and the time unit 5, and a resource corresponding to a third order is the time unit 6 to the time unit 9. An identifier of a UE group in is un1, an order of the identifier un1 in the UE group set is 1, and a device in the UE group n1 may occupy the resource corresponding to the first order in the resource release duration set, namely, the time unit 1 to the time unit 3. An identifier of a UE group n2 is un2, an order of the identifier un2 in the UE group set is 2, and a device in the UE group 2 may occupy the resource corresponding to the second order in the resource release duration set, namely, the time unit 4 and the time unit 5. An identifier of a UE group n3 is un3, an order of the identifier un3 in the UE group set is 3, and a device in the UE group n3 may occupy the resource corresponding to the third order in the resource release duration set, namely, the time unit 6 to the time unit 9.

For another example, the resource information indicated by the configuration information carried in the beacon message may include the resource release frequency domain set and the UE group set. The resource release frequency domain set may include indication information of at least one piece of frequency domain resource. The UE group set may include an identifier of at least one UE group.

A UE group whose identifier of the UE group is in the UE group set may occupy, based on an order of the identifier of the UE group in the UE group set, a resource in the same order corresponding to indication information of resource frequency domain in the resource release frequency domain set. For example, the UE group set is {un1, un2, un3}, and the resource release frequency domain set is {p1, p2, p3}. An identifier of a UE group n2 is un2, an order of the identifier un2 in the UE group set is 2, and a device in the UE group n2 may occupy a resource corresponding to the order 2, namely, a resource corresponding to p2, in the resource release frequency domain set.

In still another example, the resource information indicated by the configuration information carried in the beacon message may include the resource release duration set and the resource release frequency domain set. The resource release duration set carried in the beacon message may include at least one piece of resource release duration or resource proportion. The resource release frequency domain set carried in the beacon message may include indication information of at least one frequency domain resource. The SL UE in the another UE group may occupy a resource corresponding to any indication information in the resource release frequency domain set, and duration for which the SL UE occupies the resource corresponding to the indication information is a resource corresponding to any resource release duration or a resource corresponding to a time unit proportion in the resource release duration set. In other words, the duration in which the SL UE occupies the resource corresponding to the frequency needs to meet a specific duration limit. The duration in which the SL UE occupies the resource corresponding to the frequency should be any resource release duration in the resource release duration set, and cannot be duration outside the resource release duration set.

In a possible implementation, a correspondence between the resource release duration or the time unit proportion in the resource release duration set and the frequency in the resource release frequency domain set is index information. For example, the resource release duration set includes at least one piece of resource release duration. The beacon message may further carry index information of each piece of indication information in the resource release frequency domain set and each resource release duration in the resource release duration set. The SL UE in the another UE group may determine, based on the index information carried in the beacon message, a frequency corresponding to each resource release duration.

It is assumed that the index information of each piece of indication information in the resource release frequency domain set and each resource release duration in the resource release duration set may be {11, 12, 23, 33}. A temporarily released time-frequency resource may be determined based on an element in the index information, and each element includes two characters, a first character is an element order of a duration resource in the resource release duration set, a second character is an element order of a frequency resource in the resource release frequency domain set, and each element character may uniquely point to one tune-frequency resource. For example, the resource release duration set is {t4, t5, t6}. The resource release duration set includes resource release duration t4, t5, and t6. Any value in the resource release duration set represents a quantity of time units. For example, a resource represented by t4 being 3 is a time unit 1 to a time unit 3, t5 being 2 represents a time unit 4 and a time unit 5, t6 being 4 represents a time unit 6 to a time unit 9. The resource release frequency domain set is {p1, p2, p3}. The resource release frequency domain set includes indication information p1, p2, and p3, and any indication information in the resource release frequency domain set represents a quantity of channel resources. The element "11" in the index information represents that a frequency domain resource corresponding to the indication information p1 in the time-frequency resource corresponding to t4, namely, a frequency domain resource corresponding to the time unit 1 to the time unit 3 in the indication information p1, is released. The element "12" in the index information represents that a resource corresponding to the indication information p2 in the time-frequency resource corresponding to t4, namely, a frequency domain resource corresponding to the time unit 1 to the time unit 3 in the indication information p2, is released. The element "23" in the index information represents that a frequency domain resource corresponding to the indication information p3 in the time-frequency resource corresponding to t5, namely, a frequency domain resource corresponding to the time unit 4 and the time unit 5 in the indication information p3, is released. The element "33" in the index information represents that a frequency domain resource corresponding to the indication information p3 in the time-frequency resource corresponding to 6, namely, a resource corresponding to the time unit 6 to the time unit 9 in the indication information p3, is released. It should be noted that the index information may alternatively be set in another form. A form of the index information is not specifically limited in this application.

In a possible implementation, the configuration information carried in the beacon message sent by the device 1 may be pre-configured, and the configuration information carried in the beacon message sent each time is the same.

In a possible implementation, the configuration information carried in the beacon message sent by the device 1 may be determined based on a status of a time-frequency resource used by each transmission pair in the UE group 1 after the device 1 determines that the SL UE in the UE group 1 uses the allocated time-frequency resource.

In a possible design, the beacon message is carried by a Zadeoff-Chu sequence, and a root index of the Zadeoff-Chu sequence is determined based on an identifier of the UE group 1 and a length of the Zadeoff-Chu sequence.

The root index of the Zadeoff-Chu sequence may be a root sequence identifier of the Zadeoff-Chu sequence. Different root sequences of the Zadeoff-Chu sequence correspond to different root sequence identifiers of the Zadeoff-Chu sequence. The Zadeoff-Chu sequence of each user group has a different root index.

For example, a root sequence identifier of the Zadeoff-Chu sequence corresponding to the UE group 1 is a remainder obtained by dividing NA by ML, where NA is the identifier of the UE group 1, and ML is a length of the Zadeoff-Chu sequence. Generally, the length of the Zadeoff-Chu sequence is pre-configured, or is a default value. The identifier of each user group may be configured by a higher layer (above a physical layer) of a system including a plurality of user groups. The identifier of each user group is configured by using the higher layer. This can avoid a case in which the identifier of each user group is different, the root sequence identifier of the Zadeoff-Chu sequence corresponding to each user group is different, and a root sequence of a Zadeoff-Chu sequence corresponding to each user group is different. Alternatively, the identifier of each user group is randomly generated by each user group. Alternatively, the identifier of each user group is determined by each user group through negotiation. Alternatively, the identifier of each user group is determined according to a MAC address.

The device 1 may pre-store a correspondence between resource information and configuration information. For example, the device 1 may pre-store resource information and configuration information corresponding to each piece of resource information. The device 1 may predetermine the resource information of the resource that is in the second resource and that can be used by the another user group, for example, the target resource unit set and/or the target user group set. Then, the device 1 may determine, based on the pre-stored correspondence between each piece of resource information and configuration information, configuration information corresponding to the resource information of the resource that is in the second resource and that can be used by the another user group. A cyclic shift form of a root index of the user group to which the device 1 belongs may represent the configuration information. Different cyclic shift forms represent different configuration information, that is, different Zadeoff-Chu sequences represent different configuration information.

For example, different configuration information corresponds to different cyclic shift parameters. The Zadeoff-Chu sequence may be generated based on the root index and a cyclic shift parameter that is in a cyclic shift parameter set and that corresponds to the configuration information, where the cyclic shift parameter set includes cyclic shift parameters corresponding to a plurality of pieces of configuration information.

The device 1 may pre-store the cyclic shift parameter set. The plurality of cyclic shift parameters in the cyclic shift parameter set are cyclic shift parameters corresponding to each piece of configuration information, or the cyclic shift parameter set includes a correspondence between each piece of configuration information and a cyclic shift parameter. The device 1 may determine, from the cyclic shift parameter set based on the configuration information corresponding to the determined resource information, the cyclic shift parameter corresponding to the configuration information. The device 1 may generate the Zadeoff-Chu sequence based on the root index of the first user group and the determined cyclic shift parameter. The generated Zadeoff-Chu sequence may represent the configuration information. A device in another user group may determine corresponding configuration information based on the received Zadeoff-Chu sequence.

In another example, different configuration information corresponds to different Zadeoff-Chu sequences. The device 1 may pre-store the sequence set, where the sequence set includes Zadeoff-Chu sequences corresponding to a plurality of pieces of configuration information or a correspondence between each piece of configuration information and a Zadeoff-Chu sequence. In the plurality of pieces of configuration information, a Zadeoff-Chu sequence corresponding to each piece of configuration information is determined based on the root index and a cyclic shift parameter corresponding to each piece of configuration information. The Zadeoff-Chu sequence carrying the beacon message sent by the device 1 may be a target Zadeoff-Chu sequence that is in the sequence set and that corresponds to the configuration information corresponding to the resource information of the resource that is in the second resource and that can be used by the another user group and that is predetermined by the device 1.

Step S302: The device 2 detects the first beacon beacon message on the beacon indication resource corresponding to the first resource, where the first resource belongs to a first resource pool, the first resource pool includes a plurality of periodic resources that are allocated to the user group UE group 1 for sidelink SL communication, each resource corresponds to one beacon indication resource, the device 2 belongs to a second user group, and the first beacon beacon message is used to indicate that the first resource is used by the device in the user group UE group 1 and another user group except the user group UE group 1 cannot use all or a part of the first resource. If the first beacon message is detected, step S303 is performed next, or if the first beacon message is not detected, step S304 is performed next.

In this embodiment of this application, the device 2 belongs to the UE group 2, and is different from the user group to which the device 1 belongs.

Step S303: The device 2 determines that the first resource is used by the device in the user group UE group 1 and the second user group cannot use the first resource.

If detecting the first beacon message, the device 2 determines that the first resource is used by the device in the UE group 1 and the second user group cannot use the first resource.

In a possible design, the first beacon message carries configuration information of the first resource pool. The device 2 may store the detected first beacon message, to include the configuration information of the first resource pool in the first beacon message, and use a resource temporarily released by the UE group 1 after the first resource.

The first beacon message may be carried by a first Zadeoff-Chu sequence. The first Zadeoff-Chu sequence is determined based on the identifier of the UE group and a length of a preset or default Zadeoff-Chu sequence. For example, the device 2 may determine the root index of the first Zadeoff-Chu sequence through identification, matching, or the like, and then determine, based on the root index, the user group to which the first Zadeoff-Chu sequence belongs. The device 2 may determine the cyclic shift parameter of the first Zadeoff-Chu sequence through identification or matching, and then determine, based on the cyclic shift parameter, the configuration information (represented configuration information) and the corresponding resource information carried in the first beacon message. For another example, the device 2 may determine the root index and the cyclic shift parameter of the first Zadeoff-Chu sequence through identification, matching, or the like, and then determine, based on the determined user group corresponding to the root index and the cyclic shift parameter, the configuration information (represented configuration information) and corresponding resource information carried in the first beacon message.

A device (for example, a group head) in each user group may pre-store configuration information corresponding to each cyclic shift of the user group corresponding to the root index, and corresponding resource information: or pre-store configuration information and resource information corresponding to each Zadeoff-Chu sequence, so as to determine a user group to which a received beacon message belongs, or determine resource information indicated by configuration information carried in a received beacon message.

Step S304: The device 2 determines that the first resource is not used by the device in the user group UE group 1 and all or a part of the first resource can be temporarily used by the another user group.

If the device 2 does not detect the first beacon message, the device 2 determines that the first resource is not used by the device in the UE group 1 and all or a part of the first resource can be temporarily used by the another user group. If the device 2 pre-stores the configuration information of the first resource pool, the device 2 may use the first resource based on the configuration information of the first resource pool.

In a possible implementation, the device 2 may detect a second beacon message on a beacon indication resource corresponding to a second resource. The second resource is a resource in the first resource pool, and a time domain location of a period corresponding to the second resource is after a time domain location of a period corresponding to the first resource. If detecting the second beacon message in the second beacon indication resource, the device 2 may determine that the second resource is used by the UE group 1 and the second resource cannot be used by the device in the another user group. In other words, the device 2 may determine that the second resource is not temporarily released by the UE group 1.

If the device 2 does not detect the second beacon message in the second beacon indication resource, the device 2 may determine that the second resource is the resource temporarily released by the UE group 1. The device 2 may use the second resource based on the pre-stored configuration information of the first resource pool. For example, the second resource is used based on the configuration information, of the first resource pool, carried in the first beacon message.

The configuration information of the first resource pool indicates resource information of a temporarily released resource. The device 2 may determine the resource information of the second resource based on the pre-stored configuration information of the first resource pool. The resource information may include the target resource unit set and/or the target user group set.

For example, the device 2 may determine that an identifier of the UE group 2 is in the target user group set, and determine that the device in the UE group 2 may use all or a part of the second resource. For example, the device 2 may use a resource corresponding to the target resource unit set.

For example, the target resource unit set may include a resource release duration set: or the target resource unit set includes a resource release frequency domain set: or the target resource unit set includes the resource release duration set and the resource release frequency domain set.

For example, the resource release duration set may include at least one time unit quantity, a first time unit quantity is used to indicate a quantity of time units included in a resource that is in the second resource and that can be used by the device in the another user group, and the first time unit quantity belongs to the at least one time unit quantity. The device 2 determines that the device in the UE group 2 may use a resource corresponding to the at least one quantity of time units.

For another example, the resource release duration set may include at least one time unit proportion, and a time unit proportion indicates a ratio of a time unit included in a resource that is in the second resource and that can be used by the device in the another user group to a total quantity of time units in the second resource. The device 2 determines that the device in the UE group 2 may use a resource corresponding to the at least one time unit proportion.

The resource release frequency domain set may include indication information corresponding to at least one frequency domain resource in the second resource, and the indication information indicates a frequency domain resource that can be used by the device in the another user group. For example, the frequency domain resource may be a channel resource. The indication information corresponding to the frequency domain resource may indicate or represent the channel resource. Optionally, the channel resource may be the sub-channel resource in the foregoing embodiment. The device 2 may determine that the device in the UE group 2 may use the frequency domain resource corresponding to the at least one piece of indication information in the resource release frequency domain set.

Based on the foregoing embodiment, for ease of description, it is assumed that a plurality of UE groups that occupy, in a contention manner, the resource temporarily released by the third UE group include a fifth UE group and a sixth UE group.

This embodiment of this application further provides a resource contention manner. The plurality of UE groups occupy, in a contention manner, the resource temporarily released by the third UE group.

A GH in each UE group in the plurality of UE groups may detect a resource occupation signal (busy tone) in a preset quantity of consecutive sensing slots in the temporarily released resource. All consecutive sensing slots start from a first sensing slot of the resource temporarily released by the third UE group.

In a possible implementation, each UE group may detect the busy tone in a specified sensing slot in the consecutive sensing slots. Alternatively, an order of the specified sensing slot may be any integer randomly selected from [1, M] by a GH in each UE group.

GHs in the plurality of UE groups may use a backoff counter to control detection of the busy tone in a specified slot (slot). For example, an initial value of the backoff counter at the GH is an integer n in [1, M]. The GH in the UE group controls a value of the backoff counter to decrease by 1 after each sensing slot ends. When the value of the backoff counter is 1, the GH detects the signal in a sensing slot corresponding to the resource temporarily released by the third UE group, and determines energy of the detected signal. If the energy of the signal detected by the GH is greater than or equal to a preset energy threshold (eref), it is determined that the detected signal is the busy tone and the resource temporarily released by the third UE group is occupied. If the energy of the signal detected by the GH is less than the eref, it is determined that the detected signal is not the busy tone and the resource temporarily released by the third UE group is not occupied. The GH continuously sends the busy tone in the sensing slot until the sensing slot ends.

Figure 15:
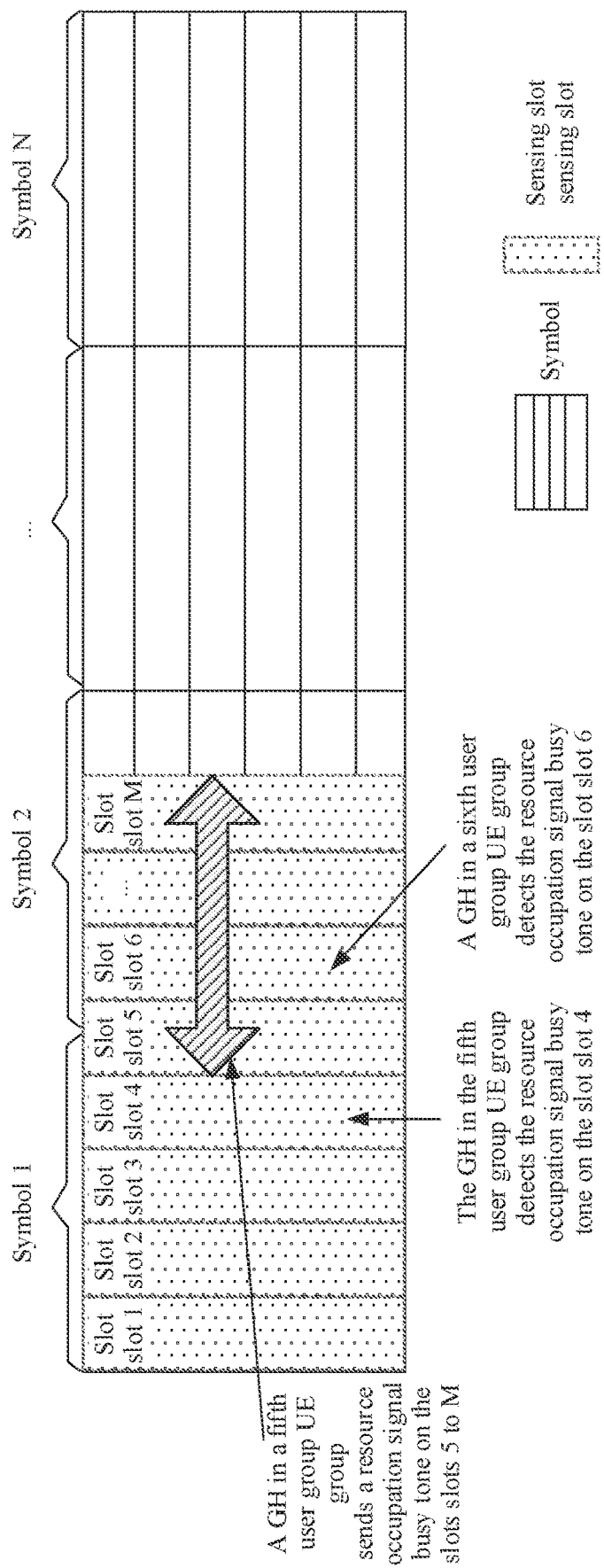
FIG. 15 is a schematic diagram of a resource occupation process according to an embodiment of this application.

As shown in FIG. 15, an initial value of a backoff counter of a GH in the fifth UE group is 4, and an initial value of a backoff counter of a GH in the sixth UE group is 6. Starting from a slot 1 in a sensing slot of the resource temporarily released by the third UE group, counts of backoff counters of GHs in the fifth UE group and the sixth UE group are decreased by 1 after each slot ends.

When a count of the backoff counter of the GH in the fifth UE group is 1, signal detection is also performed in the slot 4. If it is detected that energy of a signal is greater than or equal to eref, it is determined that the signal is the busy tone and the temporarily released resource is occupied by the another UE group. If detecting that the energy of the signal is less than eref, the fifth UE group determines that the signal is not the busy tone and the temporarily released resource is not occupied by the another UE group. The fifth UE group may continuously send the busy tone after the slot 5 starts, until the sensing slot ends, that is, a slot M ends.

When a count of the backoff counter of the GH in the sixth UE group is 1, signal detection is also performed in the slot 6. If it is detected that energy of a signal is greater than or equal to eref, it is determined that the signal is the busy tone and the temporarily released resource is occupied by the another UE group. If it is detected that the energy of the signal is less than eref, the signal is not the busy tone. If determining that no busy tone is detected in the slot 6, the GH in the sixth UE group determines that the temporarily released resource is not occupied by the another UE group. The GH in the sixth UE group may continuously send the busy tone in a slot 7 to the slot M.

It is assumed that the fifth UE group occupies the temporarily released resource. The GH in the fifth UE group continuously sends the busy tone in the slot 5 to the slot M. The sixth UE group may detect one signal in the slot 6, and determine that the energy of the detected signal is greater than eref. The sixth UE group may determine that the signal is the busy tone, and determine that the resource temporarily released by the third UE group is occupied.

In another possible implementation, each UE group may detect the busy tone in a plurality of specified sensing slots in the consecutive sensing slots.

GHs in the plurality of UE groups may use a detection counter to control detection of the busy tone in the plurality of specified slots. For example, an initial value of the detection counter at the GH is an integer n in [1, M]. The GH in the UE group controls a value of the detection counter to decrease by 1 after each sensing slot ends. In the sensing slot corresponding to the temporarily released resource, the GH starts to detect the signal in the first slot until a value of the detection counter is 0, that is, detects a signal in the first n slots.

If the GH detects the signal before an $n^{th}$ slot ends, the GH determines energy of the detected signal. If the energy of the signal detected by the GH is greater than or equal to a preset energy threshold (eref), it is determined that the detected signal is the busy tone and the resource temporarily released by the third UE group is occupied. If the energy of the signal detected by the GH is less than eref, it is determined that the detected signal is not the busy tone and the resource temporarily released by the third UE group is not occupied.

If the GH does not detect the busy tone before the $n^{th}$ slot ends, the GH can send the busy tone in an $(n+1)^{th}$ slot.

Figure 16:
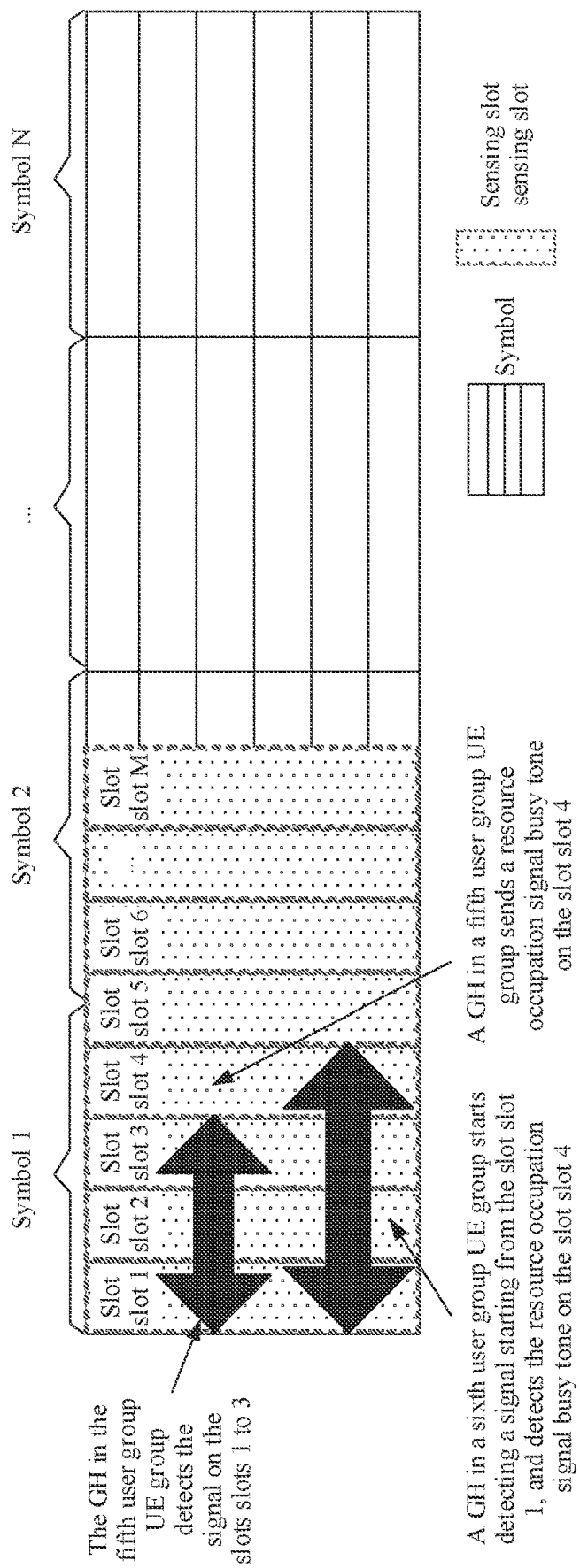
FIG. 16 is a schematic diagram of another resource occupation process according to an embodiment of this application.

As shown in FIG. 16, an initial value of a detection counter of a GH in the fifth UE group is 3. An initial value of a detection counter of a GH in the sixth UE group is 4. Counts of detection counters of GHs in the fifth UE group and the sixth UE group are decreased by 1 after each slot ends. In other words, the GH in the fifth UE group detects the busy tone in a first sensing slot to a third sensing slot. The GH in the sixth UE group detects the busy tone in the first sensing slot to a fourth sensing slot.

The initial value of the detection counter of the GH in the fifth UE group is 3, and the GH in the fifth UE group performs signal detection starting from the slot 1. If the GH in the fifth UE group does not detect the busy tone in the slots 1 to 3, the GH in the fifth UE group stops, when a count of the detection counter is 0, that is, after the slot 3 ends, detecting the signal in the temporarily released resource; or if detecting the busy tone in any one of the slots 1 to 3, the GH in the fifth UE group stops signal detection.

If detecting that the energy of the signal is greater than or equal to eref, the GH in the fifth UE group determines that the signal is the busy tone and the temporarily released resource is occupied by the another UE group. If the GH in the fifth UE group detects that the energy of the signal is less than eref, the signal is not the busy tone.

Assuming that the GH in the fifth UE group still does not detect the busy tone when the count of the detection counter is 0, the GH sends the busy tone in the slot 4. The initial value of the detection counter of the GH in the sixth UE group is 4, and the GH in the sixth UE group performs signal detection starting from the slot 1. The GH in the sixth UE group detects the signal in the slot 4, and determines that the energy of the signal is greater than eref. The GH in the sixth UE group determines that the signal is the busy tone and the temporarily released resource is occupied. The sixth UE group may stop detecting the signal in the temporarily released resource.

In a possible implementation, after detecting the second location of the beacon message, the plurality of UE groups that occupy, in the contention manner, the resource temporarily released by the third UE group contend for the temporarily released resource in N symbols before a first time unit in a resource used for blind detection by a user in the PSSCH.

For example, the third UE group temporarily releases all or a part of the time-frequency resource allocated to the third UE group. If the third UE group does not specify that a UE group uses the resource temporarily released by the third UE group, the another UE group may occupy, in a polling manner, the resource released by the third UE group.

For example, according to a pre-configured polling order, a GH in a first-polling-order UE group determines whether to occupy the resource temporarily released by the third UE group; if determining that the resource temporarily released by the third UE group does not need to be occupied, the GH notifies a GH in a second-order UE group; and if the GH in the second-order UE group confirms that the resource temporarily released by the third UE group needs to be occupied, a GH in the third-order UE group is not notified.

In addition, in this embodiment of this application, a specific time-frequency resource is allocated to each UE group that uses the same SL channel resource, to transmit data. The time-frequency resource corresponding to each UE group may be allocated in any one of the following resource allocation methods, or may be allocated in another resource allocation method.

The resource allocation method provided in this application may include but is not limited to the following two methods.

Method 1: A GH in each UE group senses and occupies a resource.

In a possible implementation, an SL channel resource may be divided into a plurality of same or different frequency domain resource blocks, and the frequency domain resource blocks are orthogonal. The GH in each UE group may determine, in any frequency domain resource block through signal detection or energy detection, a status of occupation of the frequency domain resource block by the another UE group.

In a possible implementation, after determining that an $n^{th}$ frequency domain resource block needs to be occupied, the GH in the UE group may send an occupation signal of the $n^{th}$ frequency domain resource block. The occupation signal of the n frequency domain resource block is used to indicate to occupy the $n^{th}$ frequency domain resource block. For example, the occupation signal may be any data. For another example, the occupation signal is a specified signal.

The GH in the UE group may perform energy detection on the $n^{th}$ frequency domain resource block. If the GH detects a signal, the GH determines whether energy of the signal is greater than or equal to an occupation signal energy threshold. If the energy of the signal is greater than the occupation signal energy threshold, the GH determines that the occupation signal is detected and the $n^{th}$ frequency domain resource block is occupied: or if the energy of the signal is less than the occupation signal energy threshold, the detected signal is not the occupation signal, and the GH determines that the $n^{th}$ frequency domain resource block is not occupied, and sends the occupation signal of the $n^{th}$ frequency domain resource block.

Optionally, when each GH occupies a frequency domain resource block or a time domain resource block, a quantity of blocks occupied by each GH cannot exceed a specific limit.

In a possible implementation, the SL channel resource may be divided into a plurality of same or different time domain resource blocks, the time domain resource blocks are orthogonal, and each time domain resource block may include a plurality of orthogonal time domain resources. The GH in each UE group may determine, in any time domain resource through signal detection or energy detection, a status of occupation of the time domain resource by the another UE group.

In a possible implementation, after determining a first time domain resource in an $n^{th}$ time domain resource block needs to be occupied, the GH in the UE group may send an occupation signal of the first time domain resource. The occupation signal of the first time domain resource is used to indicate to occupy the first time domain resource in the $n^{th}$ time domain resource block. For example, the occupation signal may be any data. For another example, the occupation signal is a specified signal.

The GH in the UE group may perform energy detection on the first time domain. If the GH detects a signal, the GH determines whether energy of the signal is greater than or equal to an occupation signal energy threshold. If the energy of the signal is greater than the occupation signal energy threshold, the GH determines that the occupation signal is detected and the first time domain resource in the $n^{th}$ time domain resource block is occupied; or if the energy of the signal is less than the occupation signal energy threshold, the detected signal is not the occupation signal, and the GH may determine that the first time domain resource in the $n^{th}$ time domain resource block is not occupied, and send the occupation signal of the first time domain resource.

Figure 17:
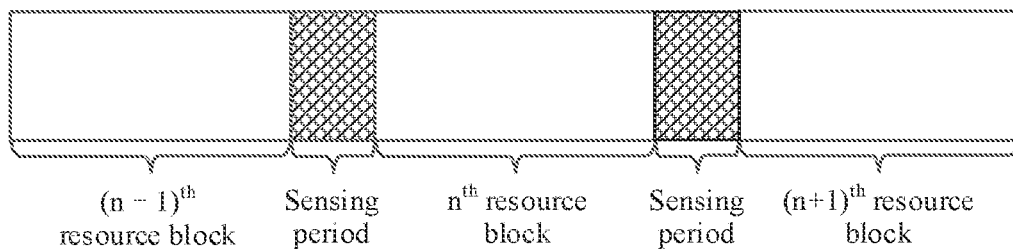
FIG. 17 is a schematic diagram of a resource of a user group according to an embodiment of this application.

In still another possible implementation, as shown in FIG. 17, an SL channel resource may be divided into a plurality of time domain resource blocks, and each time domain resource block includes a preset quantity of slots. An interval between first time domain locations in two adjacent time domain resource blocks is T. In other words, the plurality of time domain resource blocks in the SL channel resource are periodically distributed. After determining a resource in one time domain resource block needs to be occupied, the GH in the UE group listens to each slot in the time domain resource block. The GH listens to whether there is a signal in each slot.

If obtaining a signal through listening, the GH determines energy of the signal. If the energy of the signal is greater than or equal to an energy threshold for transmitting the signal, the GH determines that the time domain resource block is occupied by the another UE group: or if the energy of the signal is less than the energy threshold for transmitting the signal, the GH determines that the time domain resource block is not occupied by the another UE group.

Method 2: A base station notifies each UE group a resource configuration.

The GH in each UE group is within coverage of the base station. The base station may configure a time-frequency resource of each UE group, and a resource configuration instruction carries resource time-frequency information corresponding to the time-frequency resource of each UE group.

The resource configuration instruction may be implemented as higher layer signaling, for example, radio resource control (radio resource control. RRC) higher layer signaling, or may be downlink control information (downlink control information, DCI), or may be a control unit of media access control (media access control, MAC).

The base station may send the resource configuration instruction to each GH, and implements semi-persistent scheduling of a time-frequency resource of each UE group. The resource configuration instruction may include time-frequency information and a period. The period may be a semi-persistent scheduling period. The UE group may periodically use the resource corresponding to the resource configuration instruction. The UE group may occupy the corresponding time-frequency resource in the resource configuration instruction in the semi-persistent scheduling period. The base station performs semi-persistent scheduling on the SL channel resource, to better ensure QoS of the periodic data or the periodic service in the SL scenario.

In a possible implementation, after determining that a UE group needs a time-frequency resource to transmit data, a GH sends a resource request to the base station, where the resource request may include an identifier of the GH, an identifier of the UE group, and a service data characteristic (an average throughput requirement, a latency requirement, and a periodic service data packet period) of the UE group. The base station sends, to a device corresponding to the identifier of the GH, the information about the time-frequency resource allocated to the UE group. For example, the base station sends the resource configuration instruction to the device corresponding to the identifier, of the GH, in the resource request, where the resource configuration instruction includes the identifier of the UE group and resource time-frequency information. The resource time-frequency information may include a time-frequency resource bitmap (bitmap), a period, a time domain start location (onset) in the period, a time domain end location (offset) in the period, and the like in the SL channel.

The GH may determine, based on a frequency domain resource bitmap in the resource time-frequency information, the frequency domain resource allocated to the UE group. The frequency domain resource may be divided into a plurality of sub-channels. The frequency domain resource bitmap includes n characters, where n is a total quantity of sub-channels in the SL channel. If an $i^{th}$ character is 1, it indicates that a sub-channel corresponding to the $i^{th}$ character is an available sub-channel; or if the $i^{th}$ character is 0, it indicates that a sub-channel corresponding to the $i^{th}$ character is an unavailable sub-channel. Each bit in a bitmap of a sub-channel has a one-to-one correspondence with a sub-channel in the SL channel. For example, a first bit corresponds to a sub-channel whose channel number is 1; or a first bit corresponds to a sub-channel whose corresponding sub-channel frequency range is f1 to f2.

For example, the bitmap of the sub-channel includes seven characters, for example, 0101010. The GH may determine that the UE group may use three sub-channels, and the three sub-channels are allocated as sub-channels corresponding to a second bit, a fourth bit, and a sixth bit in the bitmap.

The GH may determine, based on the time domain resource bitmap in the resource time-frequency information, the time domain resource allocated to the UE group. A time domain resource may be divided into a plurality of time domain resource blocks. The time domain resource bitmap includes n characters, where n is a total quantity of time domain resource blocks in the SL channel. If an $i^{th}$ character is 1, it indicates that a time domain resource block corresponding to the $i^{th}$ character is an available time domain resource block; or if the $i^{th}$ character is 0, it indicates that a time domain resource block corresponding to the $i^{th}$ character is an unavailable time domain resource block. Each bit in a bitmap of a sub-channel has a one-to-one correspondence with a time domain resource block in the SL channel. For example, a first bit corresponds to a time domain resource block whose resource block number is 1: or a first bit is a time domain resource block corresponding to a time domain resource block whose time domain range is t1 to t2.

For example, the time domain resource bitmap includes nine characters, for example, 010101011. The GH may determine that the UE group may use five time domain resource blocks, and the five tune domain resource blocks are allocated as time domain resource blocks corresponding to a second bit, a fourth bit, a sixth bit, an eighth bit, and a ninth bit in the bitmap.

The GH may determine, based on a period in the resource tune-frequency information, a time domain start location (onset) in the period, a time domain end location (offset) in the period, and the like, the time domain resource allocated to the UE group. A time domain resource may be divided into a plurality of time domain resource blocks. A value of the period in the resource time-frequency information represents a quantity of time domain resource blocks in the period. For example, if the period in the time-frequency resource configuration information is 9, it indicates that there are nine time domain resource blocks in the period. In actual application, the time domain resource blocks in the period are consecutive.

A value of the time domain start location (onset) in the period represents an order of a first time domain resource block in the time domain resource blocks allocated to the UE group in all time domain resource blocks in the period. For example, if the time domain start location in the period is 2, it indicates that the first time domain resource block in the time domain resource blocks allocated to the UE group is a second time domain resource block in all the time domain resource blocks in the period.

A value of the time domain end location (offset) in the period represents an order of a last time domain resource block in the time domain resource blocks allocated to the UE group in all time domain resource blocks in the period. For example, if the time domain end location in the period is 5, it indicates that the last time domain resource block in the time domain resource blocks allocated to the UE group is a fifth time domain resource block in all the time domain resource blocks in the period.

For example, the period, the time domain start location in the period, and the time domain end location in the period in the resource time-frequency information is (10, 3, 6). The GH may determine that the time domain resource blocks that can be used by the UE group are the third to the sixth tie domain resource blocks in each period.

Optionally, when requesting the resource from the base station, the GH may indicate, to the base station, time-frequency resource information corresponding to the resource recommended by the user group to which the GH belongs. For example, after determining that the UE group needs the time-frequency resource to transmit the data, the GH sends, to the base station, the resource request carrying the information of the recommended time-frequency resource, to request, from the base station, the time-frequency resource corresponding to the information of the time-frequency resource.

After determining the time-frequency resource that can be used by the UE group, the GH may indicate each transmission pair in the UE group to occupy the corresponding time-frequency resource to transmit the data; or the GH allocates the available time-frequency resource, and then notifies each transmission pair of the time-frequency resource used during data transmission.

The GH may allocate a resource to each GM based on information such as a data type of data transmitted between the GMs, a data amount of the transmitted data, and a delay requirement: or the GH may further allocate a resource to each GM based on time-frequency resource information reported by the GM in the UE group. Before the GH allocates the resource, each GM may report, to the GH, time-frequency resource information of a resource expected to be used, or any UE in the transmission pair reports, to the GH, time-frequency resource information of a resource expected to be used.

For example, a GH and a GM may exchange data for setting up a UE group by using an SL wireless communication solution. After the UE group is set up, the GH and the GM may exchange the data by using the SL communication solution. For example, the GH sends the time-frequency resource information to the GM in the UE group through SL communication.

After determining the available time-frequency resource of the UE group, the GH may notify each GM in the UE group to contend for the available time-frequency resource. For example, in the UE group, each transmission pair may occupy the time-frequency resource of the UE group by using the sensing-selection mechanism. Each transmission pair may decode SCI 1 or SCI 2 carried in a received SL message sent by another transmission pair, to learn of resource reservation information. Each transmission pair determines an available time-frequency resource location based on the resource reservation information carried in the SCI, an indicated service priority, and RSRP of the SCI, and then randomly selects, from an available resource, a resource for sending data.

The foregoing mainly describes, from a perspective of interaction between devices, the solutions provided in embodiments of this application. It may be understood that, to implement the foregoing function, each device includes a corresponding hardware structure, software module, or a combination of the hardware structure and the software module for performing each function. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each specific application, but it should not be considered that the implementation goes beyond the scope of this application.

In embodiments of this application, function modules of the terminal and the network device may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. In actual implementation, another division manner may be used. An example in which each function module is obtained through division based on each corresponding function is used below for description.

Figure 18:
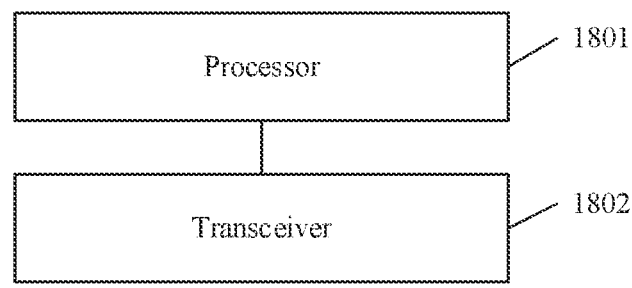
FIG. 18 is a schematic diagram of a structure of a communication apparatus according to an embodiment of this application.

FIG. 18 is a schematic diagram of a structure of a communication apparatus according to an embodiment of this application. As shown in FIG. 18, the communication apparatus includes a processor 1801 and a transceiver 1802.

The processor 1801 is configured to determine whether a first resource is used by a first user group.

The transceiver 1802 is configured to: send a beacon message on a beacon indication resource corresponding to the first resource, where the beacon message is used to indicate that the first resource is used by a device in the first user group and another user group cannot use all or a part of the first resource; or skip sending the beacon message on the beacon indication resource corresponding to the first resource, so that a device in the another user group determines that the first resource is not used by the device in the first user group and all or a part of the first resource can be temporarily used by the device in the another user group, where the communication apparatus belongs to the first user group, the first resource belongs to a first resource pool, the first resource pool includes a plurality of periodic resources that are allocated to the first user group for sidelink SL communication, and each resource corresponds to one beacon indication resource.

In a possible design, the beacon message carries configuration information of the first resource pool, the configuration information is used to indicate resource information of a resource that is in a second resource and that can be used by the another user group when the second resource meets a first condition, and the resource information includes indication information of a target resource unit set and/or indication information of a target user group set; the second resource belongs to the first resource pool, a time domain location of a period corresponding to the second resource is after a time domain location of a period corresponding to the first resource, and the first condition is that the first device skips sending a beacon message on a beacon indication resource corresponding to the second resource; the target resource unit set includes at least one resource unit in the second resource; and the target user group set includes an identifier of at least one user group, and the identifier of the user group is an identifier of a user group capable of using a resource in the target resource unit set.

In a possible design, the target resource unit set includes a resource release duration set and/or a resource release frequency domain set: the resource release duration set includes at least one time unit quantity, a first time unit quantity is used to indicate a quantity of time units included in a resource that is in the second resource and that can be used by the device in the another user group, and the first time unit quantity belongs to the at least one time unit quantity; or the resource release duration set includes at least one time unit proportion, a first time unit proportion indicates a ratio of a time unit included in a resource that is in the second resource and that can be used by the device in the another user group to a total quantity of time units included in the second resource, and the first time unit proportion belongs to the at least one time unit proportion; and the resource release frequency domain set includes indication information corresponding to at least one frequency domain resource in the second resource, and the indication information indicates a frequency domain resource that can be used by the device in the another user group.

In a possible design, the beacon message is carried by a Zadeoff-Chu sequence, and a root index of the Zadeoff-Chu sequence is determined based on an identifier of the first user group and a length of the Zadeoff-Chu sequence.

In a possible design, the processor 1801 is further configured to determine a root index of the Zadeoff-Chu sequence based on the identifier of the first user group.

In a possible design, the Zadeoff-Chu sequence is generated based on the root index and a cyclic shift parameter that is in a cyclic shift parameter set and that corresponds to the configuration information, and the cyclic shift parameter set includes cyclic shift parameters corresponding to a plurality of pieces of configuration information or the Zadeoff-Chu sequence is a target sequence that is in a sequence set and that corresponds to the configuration information, the sequence set includes sequences corresponding to the plurality of pieces of configuration information, and in the plurality of pieces of configuration information, a sequence corresponding to each piece of configuration information is determined based on the root index and a cyclic shift parameter corresponding to each piece of configuration information.

In a possible design, the beacon indication resource corresponding to the first resource is orthogonal to a resource in a resource pool corresponding to at least one other user group.

In a possible design, the processor 1801 is further configured to: before the transceiver 1802 sends the beacon message on the beacon indication resource corresponding to the first resource, determine that the first user group uses the first resource. The processor 1801 is further configured to: before the transceiver 1802 skips sending the beacon message on the beacon indication resource corresponding to the first resource, determine that the first user group skips using the first resource.

In a possible design, when determining an operation performed by the first user group to use the first resource, the processor 1801 determines that the first resource is used by a second device, where the second device belongs to the first user group.

Figure 19:
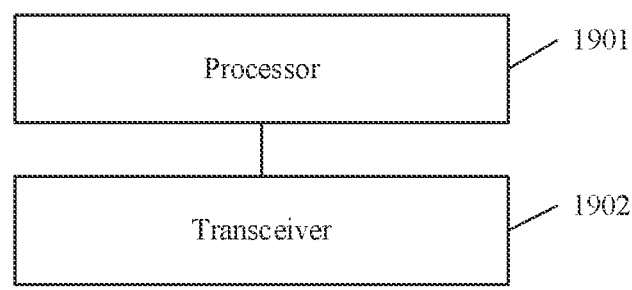
FIG. 19 is a schematic diagram of a structure of a communication apparatus according to an embodiment of this application.

FIG. 19 is a schematic diagram of a structure of a communication apparatus according to an embodiment of tins application. As shown in FIG. 19, the communication apparatus includes a processor 1901 and a transceiver 1902.

The transceiver 1902 is configured to detect a first beacon message on a first beacon indication resource corresponding to a first resource, where the first resource belongs to a first resource pool, the first resource pool includes a plurality of pieces of periodic resources that are allocated to a first user group for sidelink SL communication, each resource corresponds to one beacon indication resource, the communication apparatus belongs to a second user group, and the first beacon message is used to indicate that the first resource is used by a device in the first user group and another user group except the first user group cannot use all or a part of the first resource.

The processor 1901 is configured to: if the first beacon message is detected, determine that the first resource is used by the device in the first user group and the second user group cannot use the first resource; or if the first beacon message is not detected, determine that the first resource is not used by the device in the first user group and all or a part of the first resource can be temporarily used by the another user group.

In a possible design, the processor 1901 is further configured to: if the first beacon message is not detected, determine that the first resource is not used by the device in the first user group and all or a part of the first resource can be temporarily used by the another user group.

In a possible design, the first beacon message carries configuration information of the first resource pool, the configuration information is used to indicate resource information of a resource that is in a second resource and that can be used by the another user group when the second resource meets a first condition, and the resource information includes indication information of a target resource unit set and/or indication information of a target user group set; the second resource belongs to the first resource pool, a time domain location of a period corresponding to the second resource is after a time domain location of a period corresponding to the first resource, and the first condition is that the first device skips sending the first beacon message on a beacon indication resource corresponding to the second resource; the target resource unit set includes at least one resource unit in the second resource, and the target user group set includes an identifier of at least one user group, and the identifier of the user group is an identifier of a user group capable of using a resource in the target resource unit set.

In a possible design, the target resource unit set includes a resource release duration set and/or a resource release frequency domain set: the resource release duration set includes at least one time unit quantity, a first time unit quantity is used to indicate a quantity of time units included in a resource that is in the second resource and that can be used by the device in the another user group, and the first time unit quantity belongs to the at least one time unit quantity; or the resource release duration set includes at least one time unit proportion, a first time unit proportion indicates a ratio of a time unit that is in the second resource and that can be used by the device in the another user group to a total quantity of time units included in the second resource, and the first time unit proportion belongs to the at least one time unit proportion; and the resource release frequency domain set includes indication information corresponding to at least one frequency domain resource in the second resource, and the indication information indicates a frequency domain resource that can be used by the device in the another user group.

In a possible design, the first beacon message is carried by a Zadeoff-Chu sequence, and a root index of the Zadeoff-Chu sequence is determined based on an identifier of the first user group and a length of the Zadeoff-Chu sequence.

In a possible design, the Zadeoff-Chu sequence is generated based on the root index and a cyclic shift parameter that is in a cyclic shift parameter set and that corresponds to the configuration information, and the cyclic shift parameter set includes cyclic shift parameters corresponding to a plurality of pieces of configuration information; or the Zadeoff-Chu sequence is a target sequence that is in a sequence set and that corresponds to the configuration information, the sequence set includes sequences corresponding to the plurality of pieces of configuration information, and in the plurality of pieces of configuration information, a sequence corresponding to each piece of configuration information is determined based on the root index and a cyclic shift parameter corresponding to each piece of configuration information.

In a possible design, the transceiver 1902 is further configured to detect a second beacon message on a second beacon indication resource corresponding to a second resource.

The processor 1901 is further configured to: if the second beacon message is not detected, and the target user group set included in the resource information indicated by the configuration information carried in the first beacon message includes an identifier of the second user group, use all or a part of the second resource: or if the second beacon message is not detected, use all or a part of the second resource.

In a possible design, the processor 1901 is further configured to: after the first beacon message is detected, store the first beacon message.

In a possible design, the processor 1901 is further configured to: transmit data by using all or a part of the second resource; or if the resource information indicated by the configuration information includes the target resource unit set, and the target resource unit set includes a resource release duration set, use a target time unit in the second resource, where the target time unit is a time unit corresponding to any time unit quantity in the resource release duration set, or the target time unit is a time unit corresponding to any time unit proportion in the resource release duration set; and/or if the resource information indicated by the configuration information includes the target resource unit set, and the target resource unit set includes the resource frequency set, use a target frequency domain resource in the second resource, where the target frequency domain resource is at least one frequency domain resource corresponding to indication information in the resource release frequency domain set.

In a possible design, the one beacon indication resource is orthogonal to a resource in a resource pool corresponding to at least one other user group.

An embodiment of this application further provides a computer-readable storage medium. The computer-readable storage medium stores computer instructions. When the computer-readable storage medium is run on a communication apparatus, the communication apparatus is enabled to perform all or some of the steps in the resource processing method provided in the foregoing embodiments. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium, a semiconductor medium (for example, a solid-state drive (solid state disk. SSD)), or the like.

Figure 20:
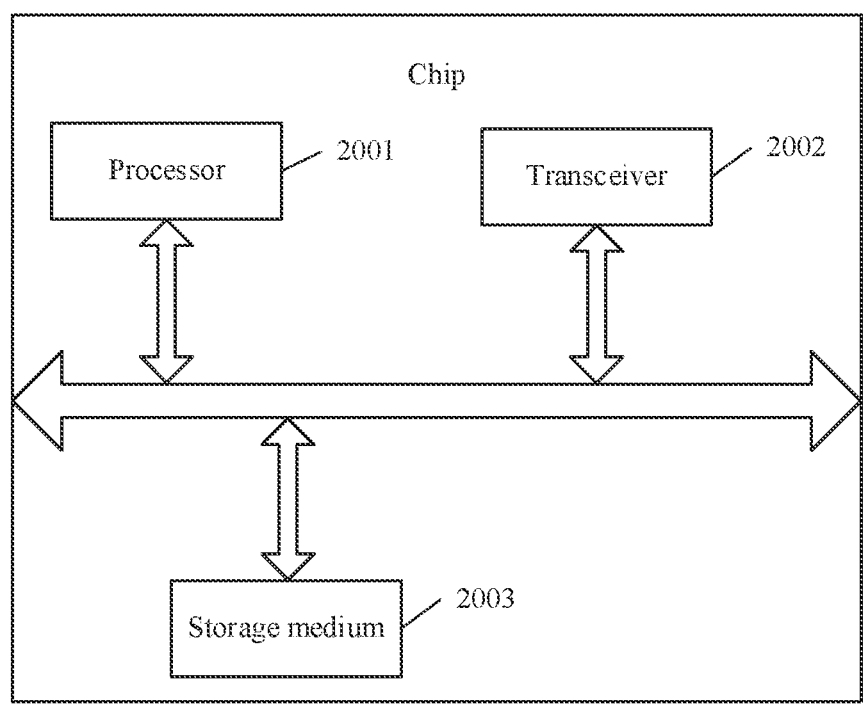
FIG. 20 is a schematic diagram of a structure of a chip according to an embodiment of this application.

An embodiment of this application further provides a computer program product including computer instructions. When the computer program product runs on a communication apparatus, the communication apparatus is enabled to perform all or some of the steps in the resource processing method provided in the foregoing embodiments FIG. 20 is a schematic diagram of a structure of a chip according to an embodiment of this application. The chip shown in FIG. 20 may be a general-purpose processor, or may be a dedicated processor. The chip includes a processor 2001. The processor 2001 is configured to support a communication apparatus in performing all or some of the steps in the resource processing method provided in the foregoing embodiments.

Optionally, the chip further includes a transceiver 2002. The transceiver 2002 is configured to accept control of the processor 2001, and is configured to support the communication apparatus in performing some steps of the resource processing method provided in the foregoing embodiments.

Optionally, the chip may further include a storage medium 2003.

It should be noted that the chip shown in FIG. 20 may be implemented by using the following circuit or component: one or more field programmable gate arrays (field programmable gate arrays, FPGAs), a programmable logic device (programmable logic device, PLD), a controller, a state machine, gate logic, a discrete hardware component, any other appropriate circuit, or any combination of circuits that can perform various functions described in this application.

Although this application is described with reference to embodiments herein, a person skilled in the art may understand and implement another variation of the disclosed embodiments by viewing the accompanying drawings, disclosed content, and the appended claims. In the claims. "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A method implemented by a first device, comprising:
sending a beacon message on a beacon indication resource corresponding to a first resource, wherein the beacon message indicates that the first resource is used by a second device in a first user group, and that a second user group cannot use all or a part of the first resource;
wherein the first device belongs to the first user group,
wherein the first resource belongs to a first resource pool comprising a plurality of periodic resources allocated to the first user group for sidelink (SL) communication,
wherein each of the periodic resources corresponds to one beacon indication resource,
wherein the beacon message carries configuration information for the first resource pool that indicates resource information for a third resource within a second resource that the second user group can use when the second resource meets a first condition,
wherein the resource information comprises a target resource unit set or a target user group set,
wherein the second resource belongs to the first resource pool,
wherein a second time domain location of a second period corresponding to the second resource is after a first time domain location of a first period corresponding to the first resource,
wherein the first condition comprises the first device does not send a second beacon message on a second beacon indication resource corresponding to the second resource,
wherein the target resource unit set comprises at least one resource unit within the second resource,
wherein the target user group set comprises a first identifier of at least one user group, and
wherein the first identifier is a second identifier of a third user group authorized to use a fourth resource within the target resource unit set.

2. The method of claim 1, further comprising:
determining that the first user group uses the first resource; or
determining that the first user group skips using the first resource.

3. The method of claim 2, further comprising determining that the first resource is used by a fourth device belonging to the first user group.

4. The method of claim 1, further comprising determining to skip sending the beacon message on the beacon indication resource to enable a third device in the second user group to determine that the first resource is unused by the second device and that all or part of the first resource can be temporarily used by the third device.

5. The method of claim 4, wherein the target resource unit set further comprises:
a resource release duration set comprising:
at least one time unit quantity that indicates time units included in a fifth resource is in the second resource and that can be used by the third device; or
a first time unit proportion indicating a ratio of a time unit in the third resource that can be used by the third device to a total quantity of time units in the second resource; or
a resource release frequency domain set comprising indication information corresponding to at least one frequency domain resource in the second resource,
wherein the indication information indicates a frequency domain resource that can be used by the third device.

6. The method of claim 1, wherein the beacon message is carried by a Zadeoff-Chu sequence, and wherein the method further comprises determining a root index of the Zadeoff-Chu sequence based on an identifier of the first user group and a length of the Zadeoff-Chu sequence.

7. The method of claim 6, wherein the Zadeoff-Chu sequence is either:
based on the root index and a cyclic shift parameter that is in a cyclic shift parameter set and that corresponds to the configuration information, wherein the cyclic shift parameter set comprises cyclic shift parameters corresponding to a plurality of pieces of configuration information; or
a target sequence that is in a sequence set and that corresponds to the configuration information, wherein the sequence set comprises sequences corresponding to the pieces of configuration information, and wherein, in the pieces of configuration information, a sequence corresponding to each of the pieces of configuration information is based on the root index and a corresponding cyclic shift parameter corresponding to each of the pieces of configuration information.

8. A method implemented by a first device, comprising:
detecting a first beacon message on a first beacon indication resource corresponding to a first resource, wherein the first resource belongs to a first resource pool, wherein the first resource pool comprises a plurality of pieces of periodic resources that are allocated to a first user group for sidelink (SL) communication, wherein each of the periodic resources corresponds to one beacon indication resource, wherein the first device belongs to a second user group, and wherein the first beacon message indicates that the first resource is used by a second device in the first user group and a third user group except the first user group cannot use all or a part of the first resource;
determining that the first resource is used by the second device and the second user group cannot use the first resource when the first device detects the first beacon message; and
determining that the first resource is not used by the second device and all or part of the first resource can be temporarily used by the third user group when the first device monitors the first resource and does not detect the first beacon message,
wherein the first beacon message carries configuration information for the first resource pool that indicates resource information for a third resource within a second resource the third user group can use when the second resource meets a first condition,
wherein the resource information comprises a target resource unit set or a target user group set,
wherein the second resource belongs to the first resource pool,
wherein a second time domain location of a second period corresponding to the second resource is after a first time domain location of a first period corresponding to the first resource, and the first condition comprises a third device skips sending the first beacon message on a beacon indication resource corresponding to the second resource,
wherein the target resource unit set comprises at least one resource unit in the second resource, wherein the target user group set comprises a first identifier of at least one user group, and wherein the first identifier is a second identifier of a fourth user group authorized to use a fourth resource in the target resource unit set.

9. The method of claim 8, wherein after determining that the first resource is not used by the second device and all or part of the first resource can be temporarily used by the third user group, the method further comprises using the first resource.

10. The method of claim 8, further comprising determining to skip sending the beacon message on the beacon indication resource to enable a third device in the second user group to determine that the first resource is unused by the second device and that all or part of the first resource can be temporarily used by the third device.

11. The method of claim 8, wherein the target resource unit set comprises:
 a resource release duration set comprising:
  at least one time unit quantity, wherein a first time unit quantity indicates time units in a fifth resource that is in the second resource and that can be used by a fourth device in the third user group, and wherein the first time unit quantity belongs to the at least one time unit quantity; or
  at least one time unit proportion, wherein a first time unit proportion indicates a ratio of a time unit in the second resource and that can be used by the fourth device to a total quantity of time units in the second resource, and wherein the first time unit proportion belongs to the at least one time unit proportion; or
 a resource release frequency domain set comprising indication information corresponding to at least one frequency domain resource in the second resource, wherein the indication information indicates a frequency domain resource that can be used by the fourth device.

12. The method of claim 8, wherein the first beacon message is carried by a Zadeoff-Chu sequence, and wherein a root index of the Zadeoff-Chu sequence is based on an identifier of the first user group and a length of the Zadeoff-Chu sequence.

13. The method of claim 12, wherein the Zadeoff-Chu sequence is either:
 based on the root index and a cyclic shift parameter that is in a cyclic shift parameter set and that corresponds to the configuration information, wherein the cyclic shift parameter set comprises cyclic shift parameters corresponding to a plurality of pieces of configuration information; or
 a target sequence that is in a sequence set and that corresponds to the configuration information, wherein the sequence set comprises sequences corresponding to the pieces of configuration information, and wherein, in the pieces of configuration information, a sequence corresponding to each of the pieces of configuration information is based on the root index and a corresponding cyclic shift parameter corresponding to each of the pieces of configuration information.

14. The method of claim 8, further comprising:
 detecting a second beacon message on a second beacon indication resource corresponding to a second resource; and
 using all or a part of the second resource when the first device does not detect the second beacon message or when the first device monitors the second resource and does not detect the second beacon message, wherein a target user group set in resource information indicated by the configuration information carried in the first beacon message comprises an identifier of the second user group.

15. The method of claim 14, further comprising:
 transmitting data using all or part of the second resource; or
 setting a target time unit in the second resource when the resource information further comprises the target resource unit set and the target resource unit set comprises a resource release duration set, wherein the target time unit corresponds to either a time unit quantity in the resource release duration set, or a time unit proportion in the resource release duration set; and
 setting a target frequency domain resource in the second resource when the resource information further comprises the target resource unit set and the target resource unit set comprises a resource frequency set,
 wherein the target frequency domain resource corresponds to indication information in a resource release frequency domain set of the target resource unit set.

16. A first device comprising:
 a memory configured to store instructions; and
 a processor coupled to the memory and configured to execute the instructions to cause the first device to:
  send a beacon message on a beacon indication resource corresponding to a first resource, wherein the beacon message indicates that the first resource is used by a second device in a first user group and that a second user group cannot use all or a part of the first resource;
 wherein the first device belongs to the first user group,
 wherein the first resource belongs to a first resource pool comprising a plurality of periodic resources allocated to the first user group for a sidelink (SL) communication,
 wherein each of the periodic resources corresponds to one beacon indication resource,
 wherein the beacon message carries configuration information for the first resource pool that indicates resource information for a third resource within a second resource that the second user group can use when the second resource meets a first condition,
 wherein the resource information comprises a target resource unit set or a target user group set,
 wherein the second resource belongs to the first resource pool,
 wherein a second time domain location of a second period corresponding to the second resource is after a first time domain location of a first period corresponding to the first resource,
 wherein the first condition comprises the first device does not send a second beacon message on a second beacon indication resource corresponding to the second resource,
 wherein the target resource unit set comprises at least one resource unit from the second resource,
 wherein the target user group set comprises a first identifier of at least one user group, and
 wherein the first identifier is a second identifier of a third user group authorized to use a fourth resource within the target resource unit set.

17. The first device of claim 16, wherein the instructions further cause the first device to determine to skip sending the beacon message on the beacon indication resource to enable a third device in the second user group to determine that the first resource is unused by the second device and that all or part of the first resource can be temporarily used by the third device.

18. The first device of claim 17, wherein the target resource unit set comprises:
- a resource release duration set comprising:
  - at least one time unit quantity, wherein a first time unit quantity indicates a quantity of time units included in a fifth resource that is in the second resource and that can be used by the third device, and wherein the first time unit quantity belongs to the at least one time unit quantity; or
  - at least one time unit proportion indicating a ratio of a time unit in the fifth resource to a total quantity of time units in the second resource; or
- a resource release frequency domain set comprising indication information corresponding to at least one frequency domain resource in the second resource, wherein the indication information indicates a frequency domain resource that can be used by the third device.

19. The first device of claim 16, wherein the beacon message is carried by a Zadeoff-Chu sequence, and wherein a root index of the Zadeoff-Chu sequence is based on an identifier of the first user group and a length of the Zadeoff-Chu sequence.

20. The first device of claim 19, wherein the Zadeoff-Chu sequence is either:
- based on the root index and a cyclic shift parameter that is in a cyclic shift parameter set and that corresponds to the configuration information, wherein the cyclic shift parameter set comprises cyclic shift parameters corresponding to a plurality of pieces of configuration information; or
- a target sequence that is in a sequence set and that corresponds to the configuration information, wherein the sequence set comprises sequences corresponding to the pieces of configuration information, and wherein, in the pieces of configuration information, a sequence corresponding to each of the pieces of configuration information is based on the root index and a corresponding cyclic shift parameter corresponding to each of the pieces of configuration information.

* * * * *